(12) United States Patent
Oyama et al.

(10) Patent No.: US 8,744,660 B2
(45) Date of Patent: Jun. 3, 2014

(54) COLLECTION AND DELIVERY SUPPORT SYSTEM FOR SADDLE-RIDE TYPE ELECTRIC VEHICLES

(71) Applicant: Honda Motor Co., Ltd., Tokyo (JP)

(72) Inventors: Takahiro Oyama, Saitama (JP); Hisashi Murakami, Saitama (JP); Tomohiro Hoshi, Saitama (JP); Junya Ono, Saitama (JP); Hiroyuki Kaneta, Saitama (JP); Noriyuki Mori, Saitama (JP); Tsubasa Nose, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/834,478

(22) Filed: Mar. 15, 2013

(65) Prior Publication Data
US 2013/0261860 A1  Oct. 3, 2013

(30) Foreign Application Priority Data

Mar. 30, 2012  (JP) .................................. 2012-081510

(51) Int. Cl.
*B60L 9/00*  (2006.01)
(52) U.S. Cl.
USPC .......................................................... 701/22
(58) Field of Classification Search
CPC ........... B60L 9/00; B60L 11/00; G01C 21/00; G01C 22/00; G01C 21/34
USPC ................................ 701/22, 25, 99, 410, 527
See application file for complete search history.

(56) References Cited

U.S. PATENT DOCUMENTS

| 2011/0025267 A1* | 2/2011 | Kamen et al. | 320/109 |
| 2013/0030580 A1* | 1/2013 | Luke et al. | 700/286 |

FOREIGN PATENT DOCUMENTS

| JP | 2005-352599 A | 12/2005 |
| JP | 2010-093999 A | 4/2010 |

* cited by examiner

*Primary Examiner* — Kim T Nguyen
(74) *Attorney, Agent, or Firm* — Carrier Blackman & Associates, P.C.; Joseph P. Carrier; William D. Blackman

(57) ABSTRACT

A collection and delivery support system for a saddle-ride type electric vehicle includes a managing terminal that outputs information of registered collection/delivery destinations of cargos and information on battery charging locations arranged within a collection/delivery range of the vehicle, a server that calculates a collection/delivery route passing through respective collection and delivery destinations in order based on a possible traveling distance of the vehicle, and a mobile terminal provided with the vehicle. The server calculates the route such that it includes a battery charging location in the middle thereof, as well as estimated collection/delivery times based on the possible traveling distance information. The display displays information of the calculated route and the estimated collection/and delivery times.

20 Claims, 11 Drawing Sheets

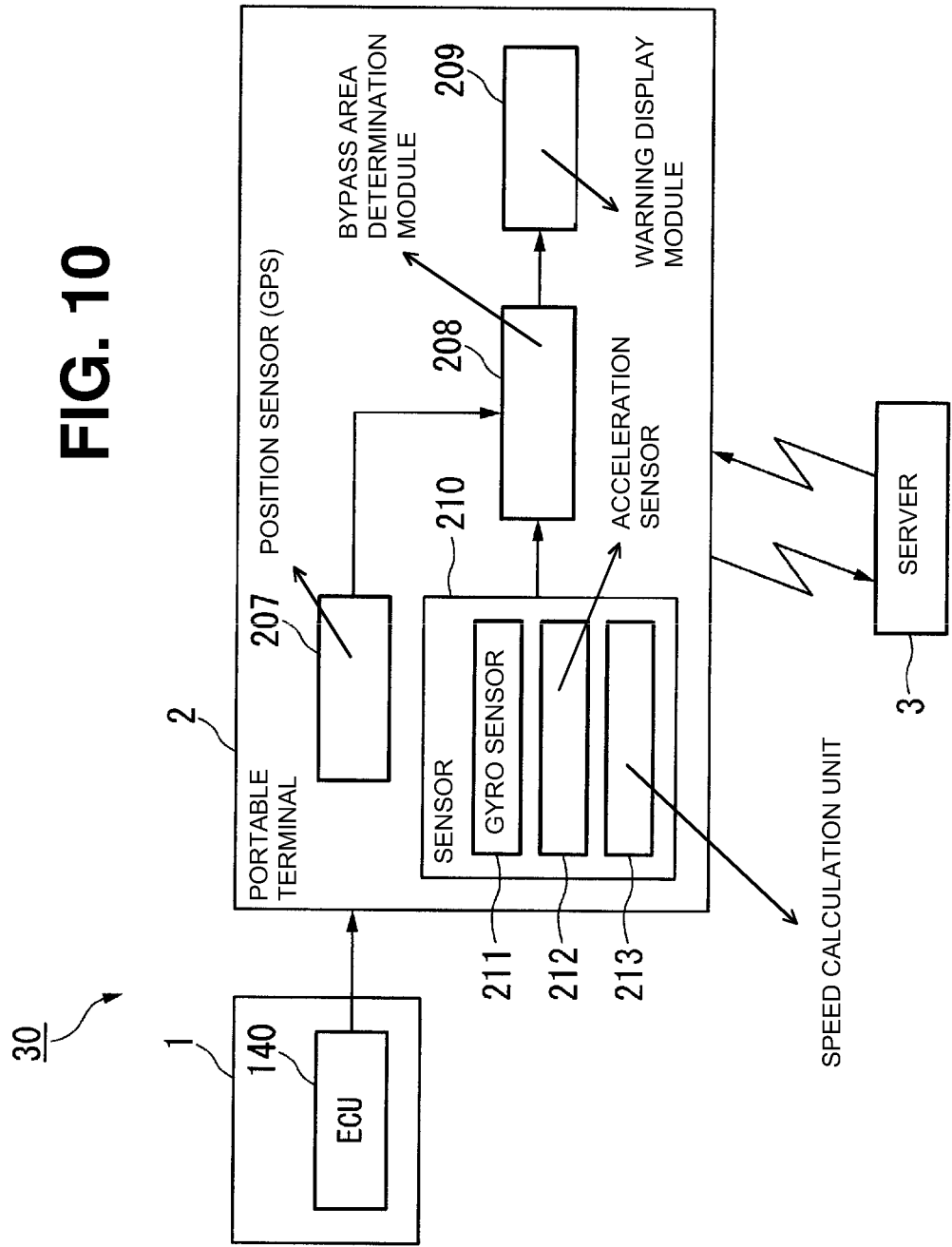

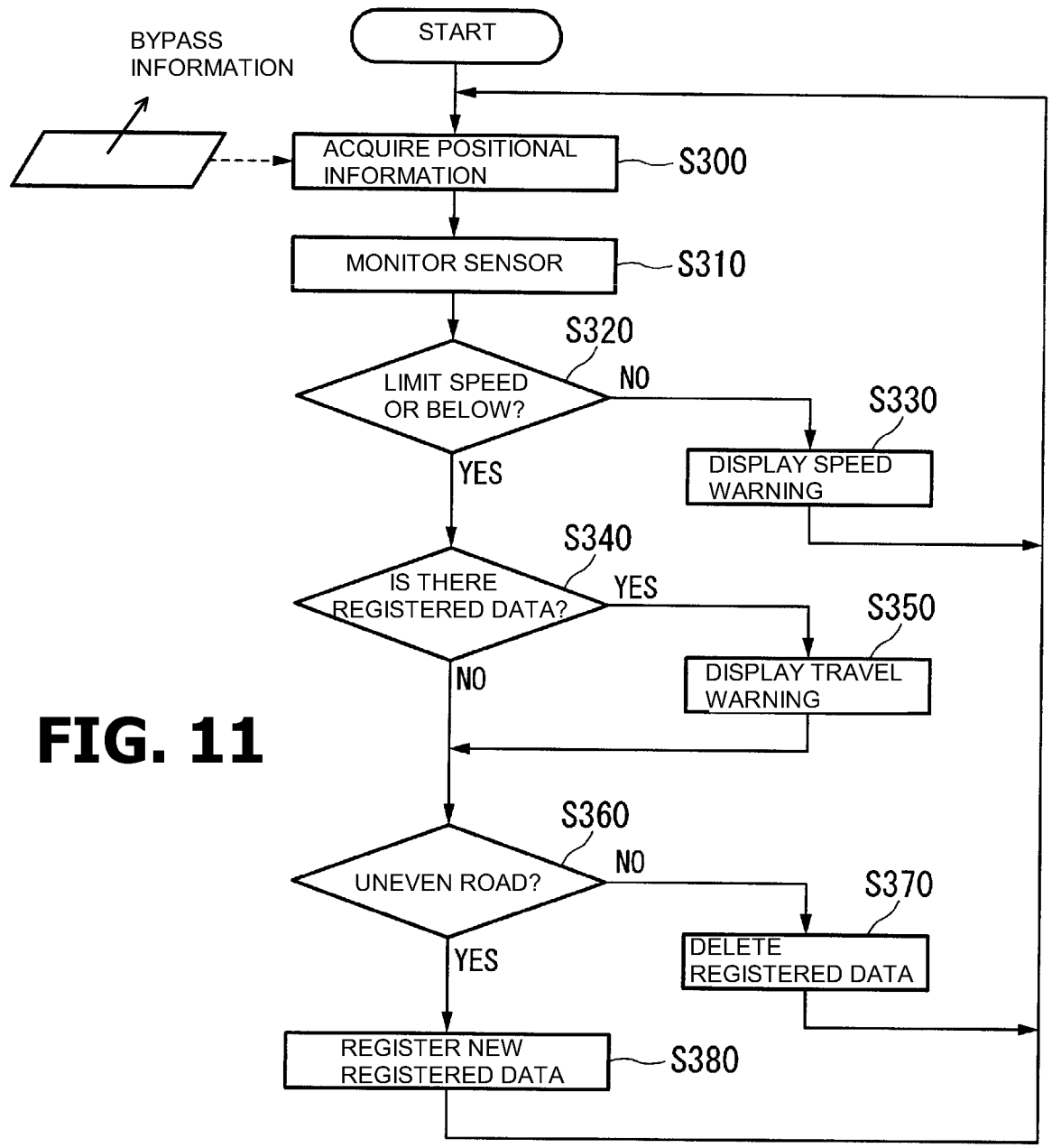

COLLECTION AND DELIVERY SUPPORT SYSTEM FOR SADDLE-RIDE TYPE ELECTRIC VEHICLES

CROSS REFERENCE TO RELATED APPLICATIONS

This application claims priority from Japanese patent application number 2012-081510, filed Mar. 30, 2012, the entire disclosure of which is incorporated herein by reference.

BACKGROUND OF THE INVENTION

1. Technical Field

The present invention relates to a collection and delivery support system that supports collection and delivery service of executing collection and delivery of cargos using a saddle-ride type electric vehicle.

2. Background Art

In recent years, development of saddle-ride type electric vehicles traveling by an electric motor driven by electric power supplied from a battery has been in progress, and cases have been increasing in which delivery agents utilize the saddle-ride type electric vehicles for collection and delivery of cargos.

The distance a saddle-ride type electric vehicle can travel changes according to the quantity of electric power stored in a battery mounted on the vehicle. Accordingly, it is preferable that a collection and delivery route by which a delivery agent collects and delivers cargos is not more than a distance the saddle-ride type electric vehicle can travel in light of the quantity of electric power stored in its battery. For example, in Patent Literature 1, a system that supports delivery service is disclosed with which a delivery route is prepared or determined in advance, and collection and delivery are executed in order according to the prepared delivery route. Also, in Patent Literature 2 for example, a technology is disclosed which helps a user to understand whether traveling to a given destination is possible or not when a battery is charged.

Patent Literature 1 JP-A No. 2005-352599
Patent Literature 2 JP-A No. 2010-93999

Technical Problems

However, in actual collection and delivery service, there are cases where a delivery staff must return to a same collection and delivery location again due to a reason such that a customer at a collection and delivery destination is absent and the like. In such a case, the delivery staff goes to the collection and delivery location via a route different from the collection and delivery route that was prepared in advance. Further, the travel distance comes to be longer than the travel distance according to the collection and delivery route prepared in advance.

In such instances, there is a case that the delivery staff frequently executes confirmation so that the travel distance does not exceed the possible traveling distance according to the residual quantity of electric power stored in a battery. If there is no facility nearby that can charge the battery, it is required to depart from the collection and delivery route once and to charge the battery, or to exchange the vehicle, and the like, which becomes a problem in an aspect of work efficiency.

As described above, when a delivery agent utilizes saddle-ride type electric vehicles, it is necessary to pay attention not only to the collection and delivery route in collecting and delivering cargos, but also to the residual quantity of the electric power stored in the vehicles' batteries.

SUMMARY OF THE INVENTION

The present invention was developed based on recognition of the problems described above, and an object of the present invention is to provide a collection and delivery support system capable of efficiently determining a collection and delivery route considering residual quantity of electric power stored in a battery mounted on an electric vehicle used with the system.

In order to solve the problems, according to a first aspect of the present invention there is provided a collection and delivery support system that displays a travel route used in collecting and delivering cargos on a mobile terminal attached to a vehicle body of an electric vehicle that includes a battery and a battery-driven electric motor in a power unit, the support system including: a collection and delivery destination register that registers information on respective collection and delivery destinations of the cargos, and information of charging locations which are located within a range where the cargos are to be collected and delivered and where the battery can be charged, and outputs the registered information on the collection and delivery destinations and on the charging locations; a route calculator that calculates a route passing, in order, the respective collection and delivery destinations inputted from the collection and delivery destination register relative to a possible traveling distance over which the electric vehicle can travel; and a residual battery power sensor that detects a residual quantity of electric power stored in the battery and outputs information on the detected residual quantity of electric power, which relates to the possible traveling distance, to the mobile terminal; and the route calculator calculates the route for the vehicle such that the route includes at least one of the charging locations in the middle thereof based on the registered information and the possible traveling distance, and calculates estimated collection and delivery times at which the cargos are to be collected and delivered at the respective collection and delivery destinations based on the route calculated.

Also, a saddle-ride type electric vehicle according to the present invention includes all types of vehicles where a rider rides straddling a vehicle body, e.g., two-wheeled vehicles, three-wheeled vehicles having one front wheel and two rear wheels, three-wheeled vehicles having two front wheels and one rear wheel, and four-wheeled vehicles.

According to a second aspect of the present invention the mobile terminal transmits the information relating to the possible traveling distance to the route calculator through a mobile communication network; and the route calculator calculates the route for the vehicle and the estimated collection and delivery times based on the information on the collection and delivery destinations and the information on the charging locations inputted from the collection and delivery destination register, and transmits the calculated route and the estimated collection and delivery times to the mobile terminal through the mobile communication network.

According to a third aspect of the present invention the mobile terminal further transmits information on a location of the mobile terminal to the route calculator through the mobile communication network; and the route calculator updates the route and the estimated collection and delivery times based on the information on the location of the mobile terminal, and transmits the updated route and the estimated collection and delivery times to the mobile terminal through the mobile communication network.

According to a fourth aspect of the present invention the route calculator is provided within the mobile terminal, the collection and delivery destination register outputs the information on the collection and delivery destinations and on the charging locations to the route calculator within the mobile terminal.

According to a fifth aspect of the present invention the route calculator provided within the mobile terminal updates the route and the estimated collection and delivery times based on information on the position of the mobile terminal.

According to a sixth aspect of the present invention the route calculator transmits the information on the calculated, estimated collection and delivery times to customer terminals associated with respective ones of the collection and delivery destinations.

According to a seventh aspect of the present invention the route calculator receives information on availability transmitted from the customer terminals and expressing a customer's presence or absence at the associated collection and delivery destination at the estimated collection and delivery time, and, when the information on availability indicates that the customer will be absent at the estimated collection and delivery time, calculates a new route that carries over the collection and delivery destination of the associated customer terminal that has transmitted the information on availability.

According to a eighth aspect of the present invention the mobile terminal displays results of a navigation function possessed by the portable terminal along with results of the calculated route and the estimated collection and delivery times.

According to a ninth aspect of the present invention the system further comprises a bypass information server which registers information on locations to be bypassed; and wherein the mobile terminal includes a sensor that detects a travel state of the electric vehicle, transmits information on the detected travel state of the electric vehicle to the bypass information server, and displays a warning according to information on the locations to be bypassed transmitted from the bypass information server, in a superimposing manner on the displayed results of the calculated route.

According to a tenth aspect of the present invention the mobile terminal includes a sensor which detects a travel speed of the electric vehicle, and, if the detected travel speed of the electric vehicle is a predetermined threshold or more when the warning is displayed, outputs a command of lowering speed of the electric vehicle to a controller that is provided in the electric vehicle and controls the speed of the electric vehicle.

According to an eleventh aspect of the present invention the electric vehicle is a saddle-ride type electric vehicle.

Advantageous Effects of Invention

According to the first aspect of the present invention, such a route that the travel distance of the saddle-ride type electric vehicle does not exceed the possible traveling distance according to the residual quantity of electric power stored in the battery can be calculated, and delivery agents can execute collection and delivery without paying attention to the residual quantity of the battery.

According to the second aspect of the present invention, a load required for calculating the route and the estimated collection and delivery times by the portable terminal can be reduced.

According to the third aspect of the present invention, the route and the estimated collection and delivery times according to the location where the saddle-ride type electric vehicle is traveling can be calculated.

According to the fourth aspect of the present invention, the route and the estimated collection and delivery times can be calculated even without involving the mobile communication network.

According to the fifth aspect of the present invention, the route and the estimated collection and delivery times according to the location where the saddle-ride type electric vehicle is traveling can be calculated.

According to the sixth aspect of the present invention, estimated times of collecting and delivering cargos can be notified to customers associated with the respective collection and delivery destinations.

According to the seventh aspect of the present invention, cargos can be collected and delivered efficiently according to whether the customer at a given collection and delivery destination will be present or not at the estimated collection and delivery time. In other words, when the customer is to be absent at the estimated collection and delivery time, the system can appropriately calculate a route that carries over such collection and delivery destination.

According to the eighth aspect of the present invention, the route and the calculated, estimated collection and delivery times can be presented to the rider along with the guidance to the collection and delivery destinations.

According to the ninth aspect of the present invention, by notifying the rider of whether or not the location the rider travels at present is a location to be avoided, collection and delivery can be executed more safely, and information on a situation that occurs at present and is preferable to be avoided can be shared with other riders who will next pass through the same location.

According to the tenth aspect of the present invention, riding that suppresses dangerous situations more positively can be executed.

According to the eleventh aspect of the present invention, favorable effects can be exerted in saddle-ride type electric vehicles.

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific embodiments of a collection and delivery support system according to the invention and specific alternative structures and modifications thereto, the embodiments chosen for the purposes of illustration and description of the structure and method of the invention are shown in the accompanying drawings forming a part of the specification.

BRIEF DESCRIPTION OF THE DRAWINGS

FIG. 10 is a block diagram showing an outline of a system constitution in an example of additional functions of a collection and delivery support system according to an embodiment of the present invention.

FIG. 11 is a flowchart showing a processing procedure in an example of additional functions of a collection and delivery support system of the present embodiment.

DETAILED DESCRIPTION OF PRESENT EMBODIMENTS

Embodiments of the present invention will be described below referring to drawings. Also, the drawings are to be viewed in the direction of reference signs, and directions of right/left and front/rear are to mean the direction viewed by a rider sitting astride the electric vehicle.

Figure 1:
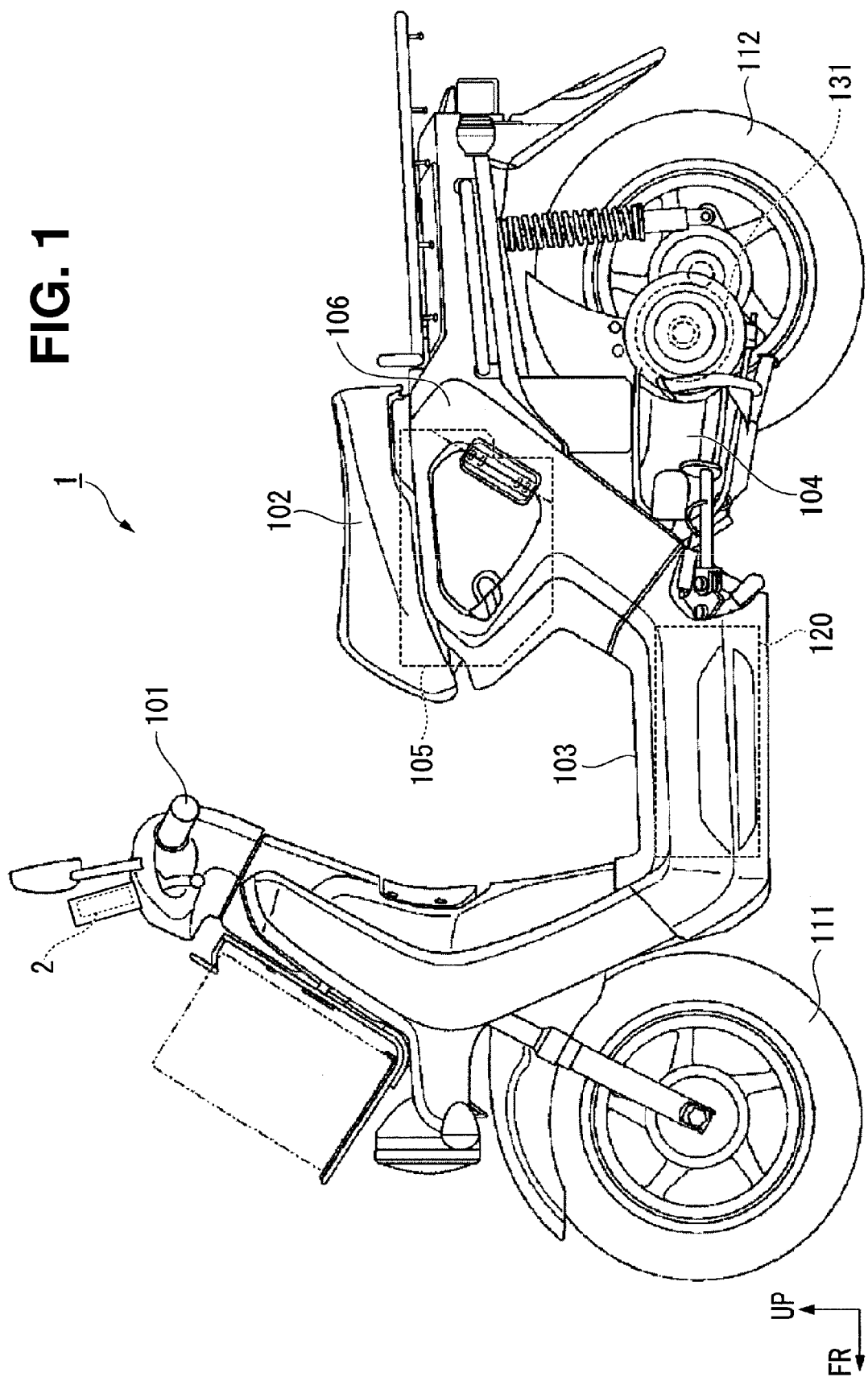
FIG. 1 is a left side view of a saddle-ride type electric vehicle to which a collection and delivery support system according to an embodiment of the present invention is applied.

FIG. 1 is a left side view of a saddle-ride type electric vehicle to which a collection and delivery support system according to an embodiment of the present invention is applied. In FIG. 1, shown is an example of a saddle-ride type electric vehicle of a scooter type (hereinafter referred to as "motor-driven two-wheeled vehicle") having a low floor. A motor-driven two-wheeled vehicle 1 shown in FIG. 1 is provided with a low floor 103 arranged between a steering handlebar 101 and a seat 102 on which a rider sits, allowing the rider to place his/her feet thereon, and covering a battery 120 from above, and includes one each of a front wheel 111 which is a steered wheel and a rear wheel 112 which is a driving wheel.

The motor-driven two-wheeled vehicle 1 travels by that an electric motor 131 incorporated in a swing arm 104 is driven by electric power supplied from the battery 120 mounted inside the low floor 103, and rotational power generated when the electric motor 131 is driven is transmitted to the rear wheel 112. Travel of the motor-driven two-wheeled vehicle 1 is controlled by a control unit arranged in an appropriate position such as inside the swing arm 104, inside an article storage box 105 below the seat 102, the inner side of right and left side covers 106, and the like, for example.

Figure 2:
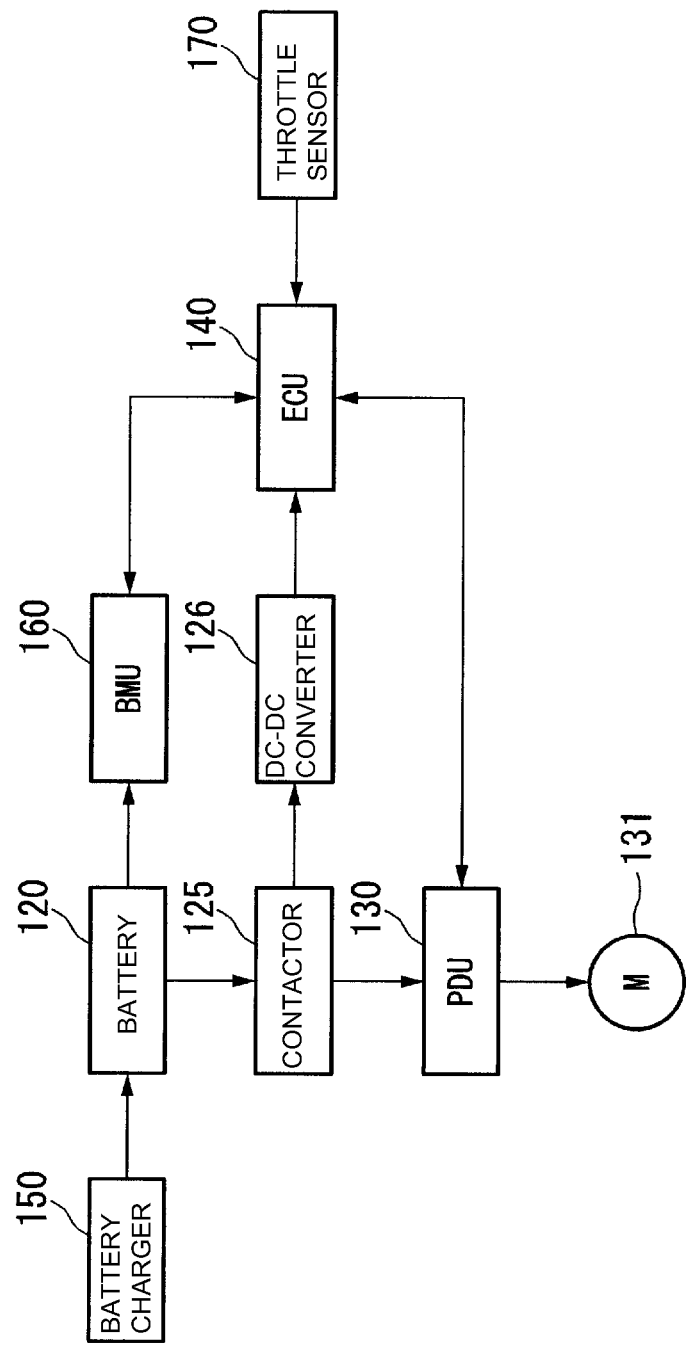
FIG. 2 is a block diagram showing a schematic constitution of a control unit controlling travel of a saddle-ride type electric vehicle to which a collection and delivery support system of the present embodiment is applied.

FIG. 2 is a block diagram showing a schematic constitution of the control unit controlling travel of the motor-driven two-wheeled vehicle 1 that is a saddle-ride type electric vehicle to which a collection and delivery support system of the present embodiment is applied.

The battery 120 generates a predetermined high voltage (48 to 72 V for example) by connecting a plurality of battery units such as a lithium ion battery, nickel-hydrogen battery, lead battery and the like for example in series. Electric power from the battery 120 is supplied to a PDU (Power Driver Unit) 130 that controls an output of the electric motor 131 through a contactor 125 that is interlocked with a main switch not shown, is converted from DC to three-phase AC by the PDU 130, and is thereafter supplied to the electric motor 131 that is a three-phase AC motor.

Also, output voltage of the battery 120 outputted through the contactor 125 is stepped down to a low voltage (12 V for example) by a DC-DC converter 126, and is supplied to control system components such as an ECU (Electronic Control Unit) 140 and the like. Further, electric power of a low voltage that has been stepped down by the DC-DC converter 126 is supplied to general electrical components such as a sub-battery, lamp and the like (not shown).

The battery 120 can be charged by a battery charger 150 connected to a power source of AC 100 V for example. A condition of charging and discharging, temperature, and the like of the battery 120 are monitored by a BMU (Battery Managing Unit) 160, and information of the monitored battery 120 is shared with the ECU 140. Information of an output request from a throttle (accelerator) sensor 170 is inputted to the ECU 140, and the ECU 140 controls drive of the electric motor 131 in that the PDU 130 controls electric power supplied to the electric motor 131 based on the information of the output request inputted. Also, in the block diagram shown in FIG. 2, the battery charger 150 also is a constitutional element of the control unit controlling travel of the motor-driven two-wheeled vehicle 1, however the battery charger 150 may be constituted so as to be detachable from the motor-driven two-wheeled vehicle 1.

First Embodiment

Figure 3:
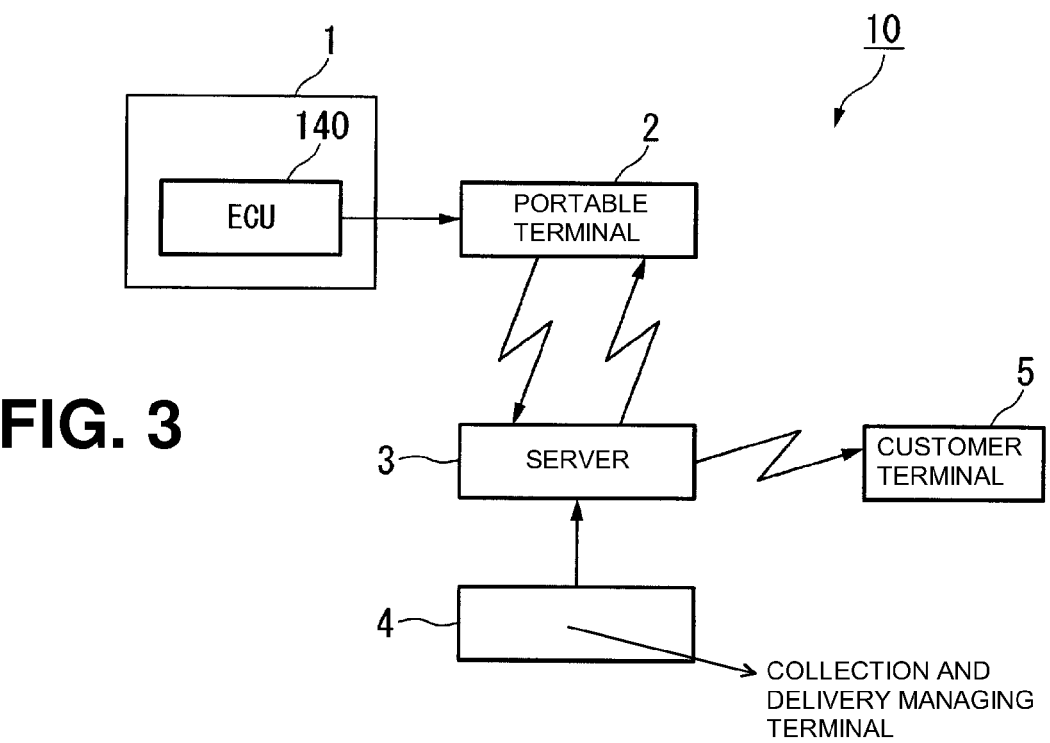
FIG. 3 is a block diagram showing an outline of a system constitution in a collection and delivery support system according to a first embodiment of the present invention.

Next, a first embodiment in the collection and delivery support system of the present invention will be described. FIG. 3 is a block diagram showing an outline of a system constitution in the collection and delivery support system according to the present first embodiment. The collection and delivery support system 10 of the present first embodiment is composed of the motor-driven two-wheeled vehicle 1, a mobile terminal 2, a server 3, and a collection and delivery managing terminal 4.

The mobile terminal 2 is a mobile terminal combining functions of a cellular phone utilizing an existing mobile communication network and functions of a portable information terminal (PDA: Personal Digital Assistant), that is a so-called smart phone for example.

The mobile terminal 2 acquires information on the motor-driven two-wheeled vehicle 1 such as information of the residual quantity of electric power stored in the battery 120 of the motor-driven two-wheeled vehicle 1 and information of the traveling possible distance of the motor-driven two-wheeled vehicle 1 according to the residual quantity of electric power stored in the battery 120 from the ECU 140 provided in the motor-driven two-wheeled vehicle 1, and transmits the acquired information on the motor-driven two-wheeled vehicle 1 to the server 3 through the mobile communication network.

Also, the mobile terminal 2 acquires information of a position sensor such as a GPS (Global Positioning System) for example provided in the mobile terminal 2 itself, that is, information of the present position of the motor-driven two-wheeled vehicle 1, and transmits the acquired information of the present position of the motor-driven two-wheeled vehicle 1 to the server 3 through the mobile communication network.

Further, it can be devised that the mobile terminal 2 transmits information of a traveling possible distance of the motor-driven two-wheeled vehicle 1 (hereinafter referred to as "traveling possible distance information") and information of the present position of the motor-driven two-wheeled vehicle 1 (hereinafter referred to as "present position information") to the server 3 regularly at every constant time, however it is also possible to be constituted so as to execute transmission at all times.

The collection and delivery managing terminal 4 is a terminal arranged in each store of the delivery agent and managing collection and delivery of cargos such as kinds of cargos collected and delivered, locations where the cargos are collected and delivered (collection and delivery destinations) and the like. Also, the collection and delivery managing terminal 4 manages information of charging locations arranged within a range the store takes charge of collection and delivery (collection and delivery range) and capable of charging the battery 120 of the motor-driven two-wheeled vehicle 1.

The collection and delivery managing terminal 4 transmits information of the collection and delivery destinations of all cargos collected and delivered this time or given route (hereinafter referred to as "collection and delivery destination information") and information of the charging locations arranged within the collection and delivery range where collections and deliveries are executed this time (hereinafter referred to as "charging location information") to the server 3 through a network environment such as a LAN (Local Area Network) and the like for example constructed within the delivery agent.

The server 3 is a server managed in the delivery agent or managed in respective stores of the delivery agent for example, calculates a collection and delivery route for collecting and delivering all cargos to be delivered and collected this time to and from the collection and delivery destinations included in the collection and delivery destination information transmitted from the collection and delivery managing terminal 4, and transmits the collection and delivery route calculated to the mobile terminal 2 through the mobile communication network. Also, the server 3 calculates the estimated collection and delivery time based on the collection and delivery route calculated, and transmits the estimated collection and delivery time calculated to the mobile terminal 2 through the mobile communication network.

Calculation of the collection and delivery route by the server 3 is executed similarly with retrieval of a route to a destination in an existing navigation system for example. At this time, condition of the collection and delivery route calculated can be set also such as giving priority to the travel distance, giving priority to the moving time, and the like for example.

Also, the server 3 calculates the collection and delivery route so that the travel distance of the motor-driven two-wheeled vehicle 1 does not exceed the possible traveling distance based on the possible traveling distance information of the motor-driven two-wheeled vehicle 1 transmitted from the mobile terminal 2. However, when a complete collection and delivery route by which all cargos can be collected and delivered without charging the battery 120 of the motor-driven two-wheeled vehicle 1 cannot be calculated due to a wide collection and delivery range and the like, the server 3 can calculate such a collection and delivery route as allowing charging in the middle of the collection and delivery route based on the charging location information transmitted from the collection and delivery managing terminal 4.

Also, as described above, the traveling possible distance information and the present position information are transmitted regularly from the mobile terminal 2. Accordingly, even when the traveling possible distance of the motor-driven two-wheeled vehicle 1 has become short in the middle of collection and delivery, for example, the server 3 can newly calculate such a collection and delivery route as executing charging at a charging location nearby based on the present position information of the motor-driven two-wheeled vehicle 1 transmitted from the mobile terminal 2, and can transmit it to the mobile terminal 2.

Further, the server 3 also can notify the customer of information of the calculated, estimated collection and delivery time. In FIG. 3, as a method for notifying a customer of the estimated collection and delivery time, shown is an example of a case where the information of the estimated collection and delivery time is transmitted through the mobile communication network to a customer terminal 5 that is a smart phone carried by the customer, for example. Also, the notification method to the customer is not limited to the notification method shown in FIG. 3. For example, in a case of a collection and delivery location and the like where collection and delivery is executed regularly and a terminal managed by a delivery agent is arranged, information of the estimated collection and delivery time can be notified to the customer also by a method other than that utilizing a mobile communication network.

The mobile terminal 2 presents order of collection and delivery of cargos to a delivery staff who is using the motor-driven two-wheeled vehicle 1 by displaying the collection and delivery route and the estimated collection and delivery times transmitted from the server 3 on a display part provided in the mobile terminal 2.

Also, the mobile terminal 2 has not only a normal communicating function but also various kinds of application functions that can be processed as a PDA. For example, there is also a mobile terminal 2 that has a navigation function of guiding the moving direction utilizing the present position information. When the mobile terminal 2 has a navigation function, it is possible to be constituted so as to superimpose the collection and delivery route transmitted from the server 3 on the navigation function and to guide the collection and delivery route in order.

Figure 4:
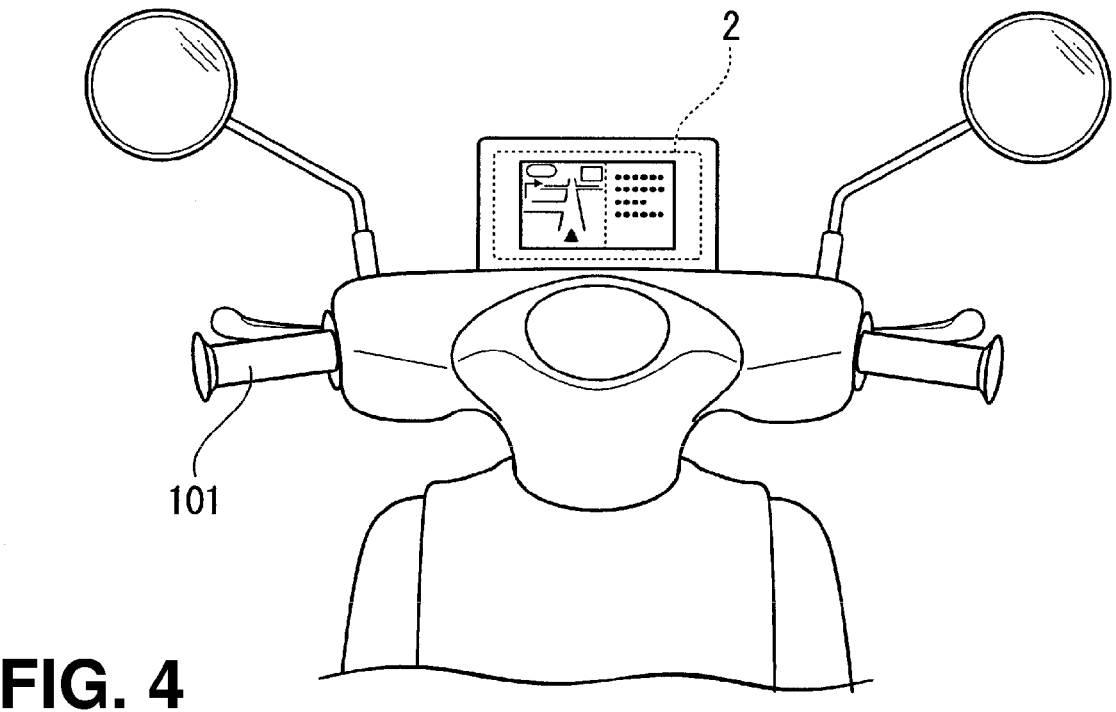
FIG. 4 is an enlarged view of a handlebar section of a saddle-ride type electric vehicle to which a collection and delivery support system of the present first embodiment is applied.

Here, with respect to connection between the ECU 140 provided in the motor-driven two-wheeled vehicle 1 and the mobile terminal 2, an example thereof will be described. FIG. 4 is an enlarged view of a handlebar section of the motor-driven two-wheeled vehicle 1 that is a saddle-ride type electric vehicle to which the collection and delivery support system 10 of the present first embodiment is applied. The mobile terminal 2 is arranged so as to be detachable at a predetermined position of the handlebar section of the motor-driven two-wheeled vehicle 1 as shown in FIG. 4, and the ECU 140 and the mobile terminal 2 are connected to each other in that a signal of the ECU 140 contacts a connector provided in the mobile terminal 2, for example. Also, the mobile terminal 2 is constituted so as to be attached and detached only by a user of the mobile terminal 2, that is, a delivery staff using the motor-driven two-wheeled vehicle 1. However, detailed description on the constitution and a specific attaching and detaching method thereof is omitted.

Figure 5:
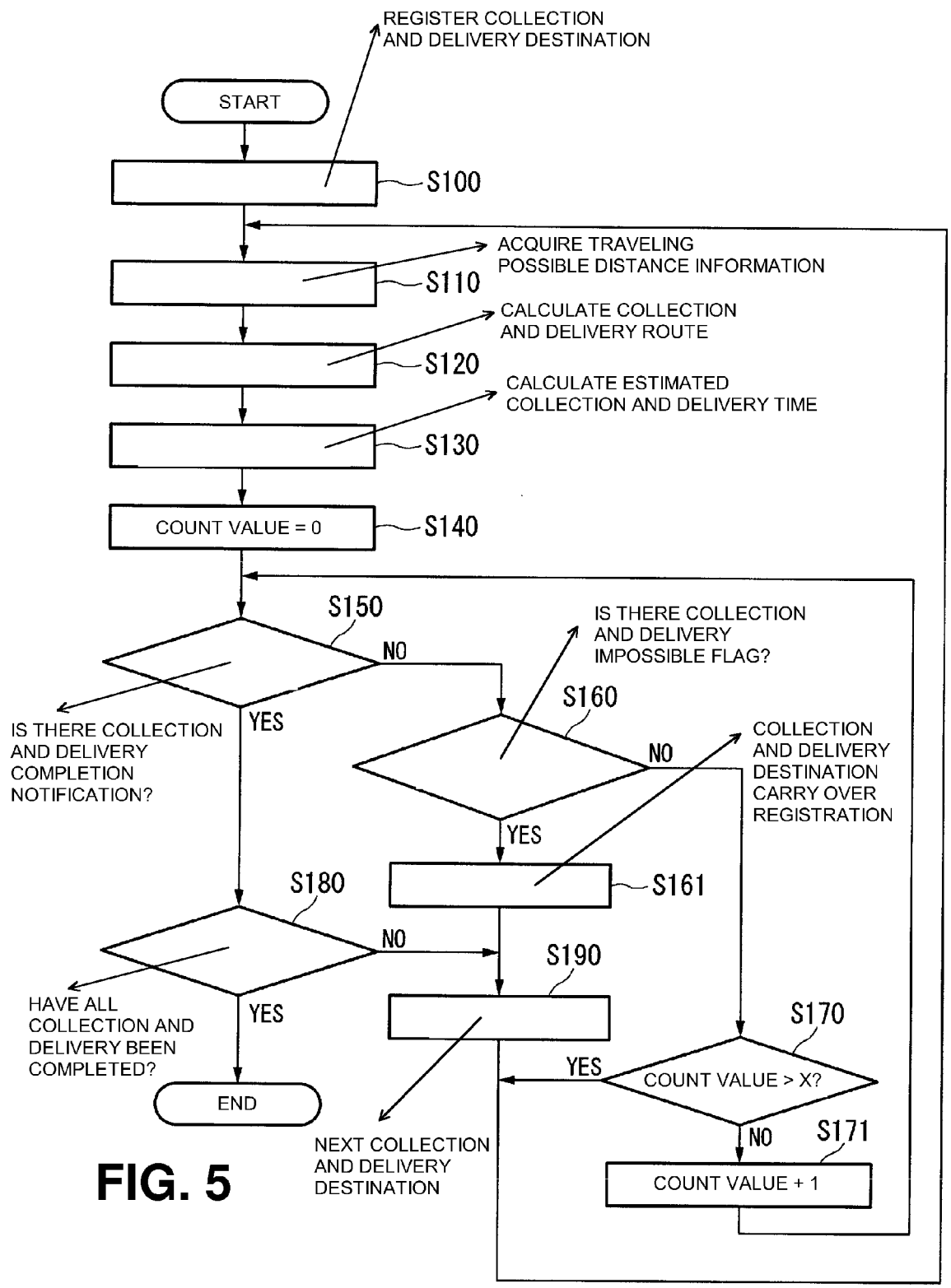
FIG. 5 is a flowchart showing a processing procedure in a collection and delivery support system of the present first embodiment.

Next, a processing procedure in the collection and delivery support system 10 of the present first embodiment will be described. FIG. 5 is a flowchart showing the processing procedure in the collection and delivery support system 10 of the present first embodiment.

In starting collection and delivery utilizing the collection and delivery support system 10, first, in step S100, the collection and delivery destinations of all cargos collected and delivered this time are registered in the collection and delivery managing terminal 4. Thereby, the collection and delivery destination information registered and information on the charging locations inside the collection and delivery range are transmitted to the server 3. Next, in step S110, the mobile terminal 2 acquires the possible traveling distance information of the motor-driven two-wheeled vehicle 1, and transmits the possible traveling distance information acquired to the server 3.

Next, in step S120, the server 3 calculates a collection and delivery route allowing returning after passing through all the collection and delivery destinations based on the collection and delivery destination information transmitted from the collection and delivery managing terminal 4 and the possible traveling distance information transmitted from the mobile terminal 2. Also, when the travel distance in collection and delivery is longer than the possible traveling distance acquired due to the collection and delivery range being excessively wide, the server 3 calculates a collection and delivery route allowing returning after passing through all the collection and delivery destinations while executing charging at a charging location arranged in the middle of the collection and delivery route based on the charging location information transmitted from the collection and delivery managing terminal 4.

Next, in step S130, the server 3 calculates the estimated collection and delivery times based on the collection and delivery route calculated. Also, the server 3 transmits the collection and delivery route and the estimated collection and delivery times calculated to the mobile terminal 2. Further, the server 3 can also notify customers of the information of the estimated collection and delivery times calculated. Thereafter, when the collection and delivery route and the estimated collection and delivery times (estimated arrival times) transmitted from the server 3 are displayed (presented) on the display part of the mobile terminal 2, the delivery staff starts the collection and delivery service, and is headed to a first collection and delivery destination riding the motor-driven two-wheeled vehicle 1. Also, in step 140, the server 3 initializes a count value that expresses elapsed time of the collection and delivery work, that is, clears the count value to "0".

Further, in step S150, the server 3 confirms whether or not there is a collection and delivery completion notification which expresses that the first collection and delivery work by the delivery staff has been completed. The collection and delivery completion notification is information which expresses that the collection and delivery work at a collection and delivery destination has been completed transmitted (notified) to the server 3 by operating the mobile terminal 2, for example, when the delivery staff has arrived at the collection and delivery destination and has completed the collection and delivery work for the delivery destination.

When there is no collection and delivery completion notification in step S150 (NO of step S150), in step S160, the server 3 confirms whether or not there is a collection and delivery impossible flag that expresses that the first collection and delivery work cannot be executed. The collection and delivery impossible flag is a flag raised by operating the mobile terminal 2 when the delivery staff determines that the collection and delivery work at the collection and delivery destination cannot be executed at the estimated collection and delivery time due to a reason that the customer at the collection and delivery destination is absent and the like.

When there is the collection and delivery impossible flag in step S160 (YES of step S160), in step S161, the server 3 registers the first collection and delivery destination (collection and delivery destination at present) so as to be carried over to an appropriate order. Also, in step S190, a process of the collection and delivery work of cargos to a next collection and delivery destination is started, and processes of step S110 to step S180 shown in FIG. 5 are repeated.

Further, when there is no collection and delivery impossible flag in step S160 (NO of step S160), in step S170, the server 3 confirms whether or not the count value expressing the elapsed time of the collection and delivery work has exceeded a value that expresses a predetermined time X (10 minutes for example).

When the count value expressing the elapsed time of the collection and delivery work has not exceeded the value that expresses the predetermined time X in step S170 (NO of step S170), in step S171, the server 3 adds 1 on the count value (count value+1), and confirms again whether or not there is the collection and delivery completion notification in step S150.

Also, when the count value expressing the elapsed time of the collection and delivery work has exceeded the value that expresses the predetermined time X in step S170 (YES of step S170), returning to step S110, the mobile terminal 2 acquires the possible traveling distance information of the motor-driven two-wheeled vehicle 1, and transmits the possible traveling distance information acquired to the server 3. Thereby, when the collection and delivery work is not completed even after the predetermined time X (the collection and delivery work is delayed) due to a traffic condition such as congestion, for example, and/or for other reasons, the server 3 can calculate again the collection and delivery route according to the residual power quantity of the battery.

Also, when there is the collection and delivery completion notification in step S150 (YES of step S150), in step S180, whether or not the collection and delivery service of this time or route, that is, the collection and delivery work for all cargos, has been completed is determined. When it is determined that the collection and delivery work for all cargos has been completed in step S180 (YES of step S180), the process of the collection and delivery service of this time is completed. Also, when it is determined that the collection and delivery work for all cargos has not been completed in step S180 (NO of step S180), the server 3 starts the process of the collection and delivery work of cargos to a next collection and delivery destination in step S190, and processes of step S110 to step S180 shown in FIG. 5 are repeated.

Further, in step S110 to step S180 shown in FIG. 5, it can be constituted also so that the collection and delivery route and the estimated collection and delivery times newly calculated are transmitted to the mobile terminal 2 only when a collection and delivery route and estimated collection and delivery times which are different from the collection and delivery route and the estimated collection and delivery times calculated at the beginning have been calculated.

Figure 6:
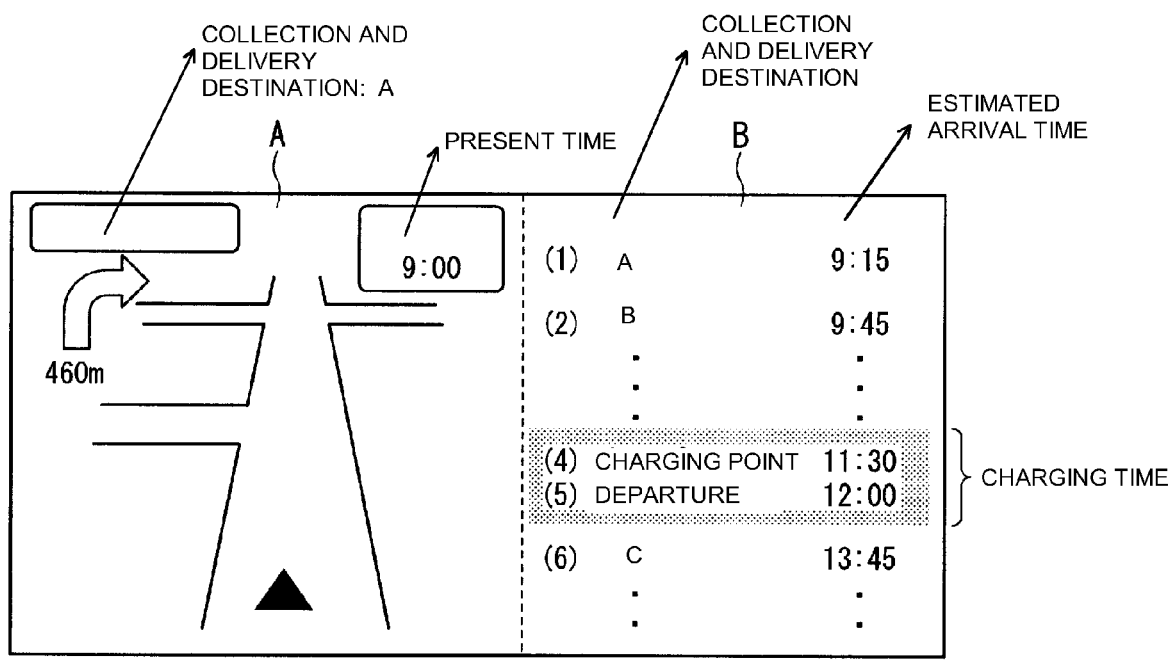
FIG. 6 is a drawing showing an example of a method for presenting a collection and delivery route in a collection and delivery support system of the present first embodiment.

Here, an example of a case where the collection and delivery route is displayed on the display part of the mobile terminal 2 arranged in the motor-driven two-wheeled vehicle 1 will be described. FIG. 6 is a drawing showing an example of a method for presenting a collection and delivery route in the collection and delivery support system 10 of the present first embodiment. Also, in an example of a presenting method shown in FIG. 6, shown is an example of a display screen of an arrangement where the collection and delivery route is displayed on the display part of the mobile terminal 2, that is, presented to the delivery staff, on the navigation function possessed by the mobile terminal 2 in a superimposing manner.

In an example of the display screen shown in FIG. 6, information of the collection and delivery route superimposed on the navigation function is displayed in a display region A, and information on the collection and delivery route and the estimated collection and delivery times is displayed in a display region B. In the display region A, by a guide display by a navigation function of the mobile terminal 2, a route allowing movement to a location of "Mr. A" who is a first collection and delivery destination is displayed. Also, in the display region B, based on the collection and delivery route and the estimated collection and delivery times transmitted from the server 3, information of the collection and delivery destinations of the cargos and the estimated arrival times for the respective collection and delivery destinations in the collection and delivery service of this time or route are displayed in the order of collection and delivery.

Also, the section shown by half-tone dot meshing in the display region B does not express the collection and delivery destinations where the cargos are collected and delivered but expresses that charging is executed at a charging location arranged in the middle of the collection and delivery route, and the time from the arrival time to the charging point (charging location) to the departure time expresses the charging time for charging the battery 120 of the motor-driven two-wheeled vehicle 1.

As described above, in the collection and delivery support system 10 of the present first embodiment, based on the possible traveling distance information of the motor-driven two-wheeled vehicle 1 acquired by the mobile terminal 2, a collection and delivery route taking the charging locations arranged within the collection and delivery range into consideration is calculated. Also, in the collection and delivery support system 10 of the present first embodiment, the possible traveling distance information of the motor-driven two-wheeled vehicle 1 is acquired each time collection and delivery of one cargo has been completed. Thereby, in the collection and delivery support system 10 of the present first embodiment, the collection and delivery route can be updated so that the travel distance of the motor-driven two-wheeled vehicle 1 does not exceed the traveling possible distance according to the residual quantity of electric power stored in the battery 120 of the motor-driven two-wheeled vehicle 1.

Also, in the collection and delivery support system 10 of the present first embodiment, the information of the collection and delivery route calculated is displayed on the navigation function possessed by the mobile terminal 2 in a superimposing manner. Thereby, in the collection and delivery support system 10 of the present first embodiment, the order of collecting and delivering cargos can be presented to the delivery staff using the motor-driven two-wheeled vehicle 1 in an easily recognized manner. Further, a method for presenting information of a collection and delivery route calculated to a delivery staff is not limited to the display superimposed on the navigation function in an example described above. For example, it is also possible to display only the information of the collection and delivery destinations and the estimated arrival time to the respective collection and delivery destinations of the display region B shown in FIG. 6 on the display part of the mobile terminal 2, and to execute display on the various kinds of application functions possessed by the mobile terminal 2 in a superimposing manner.

Further, in the collection and delivery support system 10 of the present first embodiment, a case was described in which the server 3 calculated the collection and delivery route and the estimated collection and delivery times which were presented to the delivery staff who used the motor-driven two-wheeled vehicle 1 by transmitting the collection and delivery route and the estimated collection and delivery times calculated to the mobile terminal 2. However, calculation of the collection and delivery route and the estimated collection and delivery times is not limited to one by a method in which the server 3 executes calculation. For example, calculation can be executed also within the mobile terminal 2. In this case, the collection and delivery support system 10 can be also provided as an application function of the mobile terminal 2 that calculates and displays the collection and delivery route and the estimated collection and delivery times.

Second Embodiment

Figure 7:
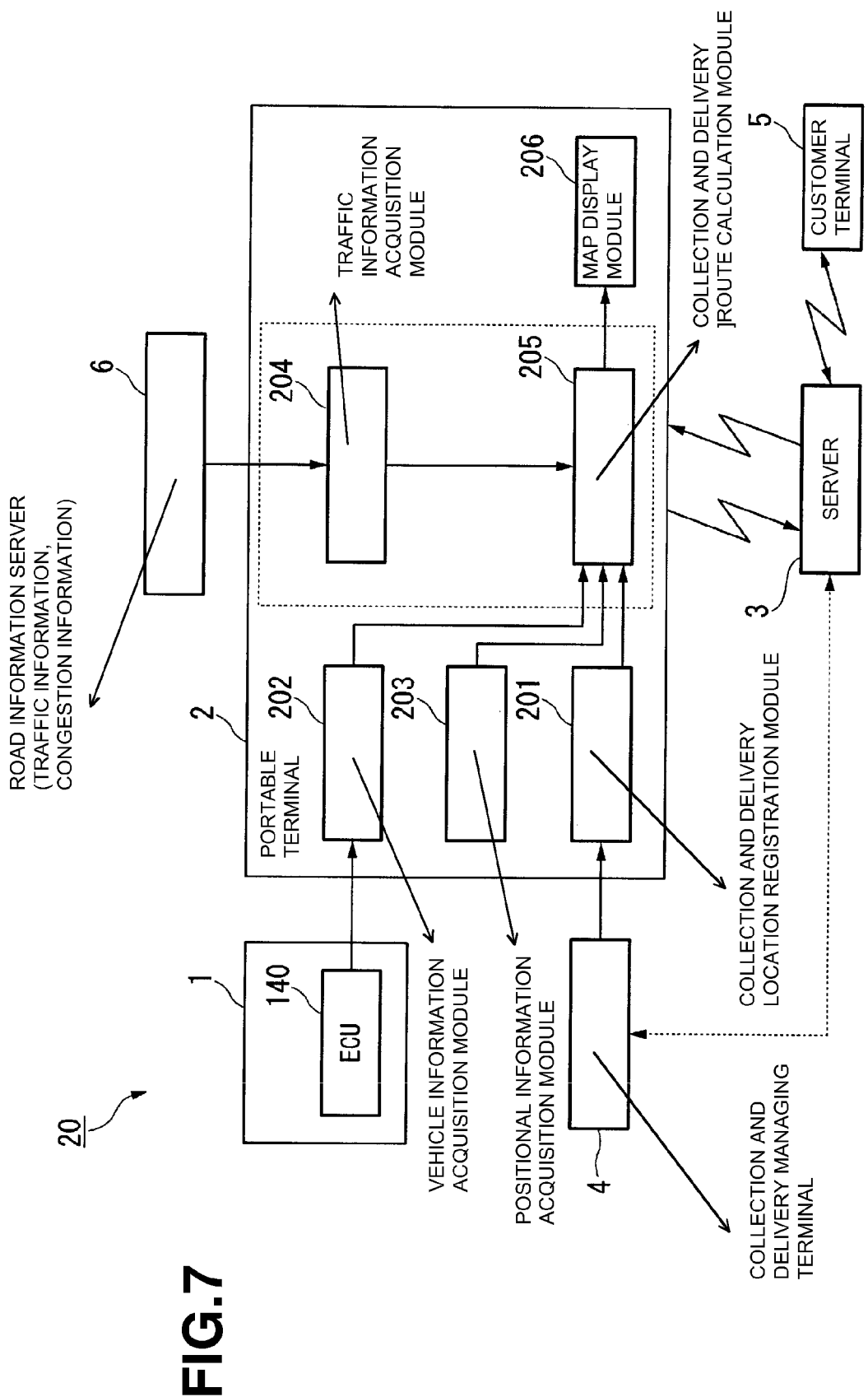
FIG. 7 is a block diagram showing an outline of a system constitution in a collection and delivery support system according to a second embodiment of the present invention.

Next, a second embodiment in the collection and delivery support system of the present invention will be described. FIG. 7 is a block diagram showing an outline of a system constitution in the collection and delivery support system according to the present second embodiment. Similarly to the collection and delivery support system 10 of the first embodiment, the collection and delivery support system 20 according to the present second embodiment calculates the collection and delivery route taking the charging locations arranged within the collection and delivery range into consideration based on the possible traveling distance information of the motor-driven two-wheeled vehicle 1, and presents it to the delivery staff who uses the motor-driven two-wheeled vehicle 1. However, in the collection and delivery support system 20 according to the present second embodiment, the collection and delivery route and the estimated collection and delivery times are calculated within the mobile terminal while also taking into consideration a situation of traffic information, congestion information, and the like. Further, in the collection and delivery support system 20 according to the present second embodiment, a state whether or not the customer at the collection and delivery destination is present is also taken.

In the description below, in the system constitution in the collection and delivery support system 20 according to the present second embodiment, for a constitutional element similar to that in the collection and delivery support system 10 of the first embodiment shown in FIG. 3, a same reference sign will be used. The collection and delivery support system 20 of the present second embodiment is composed of the motor-driven two-wheeled vehicle 1, the mobile terminal 2, the server 3, the collection and delivery managing terminal 4, the customer terminal 5, and a road information server 6. Also, similarly to the collection and delivery support system 10 of the first embodiment, the mobile terminal 2 is connected to the ECU 140 provided in the motor-driven two-wheeled vehicle 1 (refer to FIG. 4). Accordingly, detailed description on connection between the ECU 140 provided in the motor-driven two-wheeled vehicle 1 and the mobile terminal 2 will be omitted.

The collection and delivery managing terminal 4 registers the collection and delivery destination information of all cargos collected and delivered this time or route and the charging location information within the collection and delivery range where collection and delivery are executed this time to the mobile terminal 2. Also, with respect to a method for registering information by the collection and delivery managing terminal 4, a method of transmitting information to the mobile terminal 2 by radio communication can be devised, however information can be registered also by a method of transmitting information to the mobile terminal 2 by wire communication, a method of inserting a recording medium such as a memory card storing information to the mobile terminal 2, or a method of executing connection to a connector provided in the mobile terminal 2, or other methods.

Similarly to the collection and delivery support system 10 of the first embodiment, the mobile terminal 2 is a portable terminal combining functions of a cellular phone utilizing an existing mobile communication network and functions of a portable information terminal (PDA) (a smart phone for example).

The mobile terminal 2 has an application function of the collection and delivery support system 20 of the present second embodiment. The mobile terminal 2 calculates the collection and delivery route and the estimated collection and delivery times based on the possible traveling distance information acquired by calculation from the residual quantity of the battery of the motor-driven two-wheeled vehicle 1, the collection and delivery destination information and the charging location information registered in the collection and delivery managing terminal 4, and the present position information and the road information acquired from the navigation function possessed by the mobile terminal 2 itself, and displays the collection and delivery route and the estimated collection and delivery times calculated on the display part provided in the mobile terminal 2 itself. Also, the mobile terminal 2 transmits information of the estimated collection and delivery time calculated to the server 3 through the mobile communication network.

As shown in FIG. 7, the mobile terminal 2 includes a collection and delivery location registration module 201, a vehicle information acquisition module 202, a positional information acquisition module 203, a road information acquisition module 204, a collection and delivery route calculation module 205, and a map display module 206. Also, the respective modules provided in the mobile terminal 2 are software modules for achieving applications that provide a user of the portable terminal 2, that is, the delivery staff, with the function of the collection and delivery support system 20 of the present second embodiment, however, the present embodiment is not limited to this. For example, the navigation function may be set in a hardware module or the server 3 that achieves the functions of the respective modules.

The collection and delivery location registration module 201 outputs the collection and delivery destination information and the charging location information registered by the collection and delivery managing terminal 4 to the collection and delivery route calculation module 205.

The vehicle information acquisition module 202 acquires the possible traveling distance information from the ECU 140 provided in the motor-driven two-wheeled vehicle 1, and outputs the traveling possible distance information acquired to the collection and delivery route calculation module 205.

The positional information acquisition module 203 acquires the present position information of the motor-driven two-wheeled vehicle 1 from a position sensor such as a GPS and the like which are utilized by the navigation function possessed by the mobile terminal 2 itself, and outputs the present position information of the motor-driven two-wheeled vehicle 1 acquired to the collection and delivery route calculation module 205.

The road information acquisition module 204 acquires the road information such as traffic information and congestion information from the road information server 6 which is utilized by the navigation function possessed by the mobile terminal 2 itself, and outputs the road information acquired to the collection and delivery route calculation module 205.

Based on each information acquired by each of the vehicle information acquisition module 202, the positional information acquisition module 203 and the road information acquisition module 204, the collection and delivery route calculation module 205 calculates a collection and delivery route for collecting and delivering all cargos to be collected and delivered this time or route to the collection and delivery destinations included in the collection and delivery destination information registered in the collection and delivery location registration module 201.

Calculation of the collection and delivery route by the collection and delivery route calculation module 205 is executed similarly with retrieval of a route to a destination in the navigation function possessed by the mobile terminal 2 itself for example. At this time, condition of the collection and delivery route calculated can be set also such as giving priority to the travel distance, giving priority to the moving time, and the like, for example.

Also, when the collection and delivery route calculation module 205 calculates the collection and delivery route, based on the possible traveling distance information of the motor-driven two-wheeled vehicle 1 acquired by the vehicle information acquisition module 202, such a collection and delivery route that the travel distance of the motor-driven two-wheeled vehicle 1 does not exceed the possible traveling distance is calculated taking the charging locations acquired by the vehicle information acquisition module 202 into consideration. Further, the collection and delivery route calculation module 205 calculates the estimated collection and delivery times based on the collection and delivery route calculated.

Also, each of the vehicle information acquisition module 202, the positional information acquisition module 203 and the road information acquisition module 204 acquires information of each regularly or at all times. Thereby, the collection and delivery route calculation module 205 can update the collection and delivery route and the estimated collection and delivery time regularly or at all times.

Further, the collection and delivery route calculation module 205 outputs the collection and delivery route and the estimated collection and delivery time calculated to the map display module 206. Also, the collection and delivery route calculation module 205 transmits the estimated collection and delivery times calculated to the server 3 through the mobile communication network.

The map display module 206 presents the order of collecting and delivering cargos to the delivering staff who uses the motor-driven two-wheeled vehicle 1 by displaying the collection and delivery route and the estimated collection and delivery times inputted from the collection and delivery route calculation module 205 on the display part provided in the mobile terminal 2 itself combined with the navigation function possessed by the mobile terminal 2 itself.

The server 3 notifies the customer of the information of the estimated collection and delivery time transmitted from the portable terminal 2. With respect to a method for notifying a customer of the information of the estimated collection and delivery time by the server 3, transmitting an e-mail, text-message, and the like to a cellular phone, a smart phone carried by the customer, or a terminal arranged by a delivery agent for example can be devised. Also, a method for notifying a customer of the information of the estimated collection and delivery time is not limited to the notification method shown in FIG. 7. In FIG. 7, shown is an example of a case where the information of the estimated collection and delivery time is transmitted to the customer terminal 5 that is a smart phone carried by the customer for example through the mobile communication network.

In the collection and delivery support system 20 of the present second embodiment, the customer having received the information of the estimated collection and delivery time can answer availability information that expresses whether the customer is present or not in the collection and delivery destination at the estimated collection and delivery time. The server 3 transmits the availability information transmitted from the customer terminal 5 to which the information of the estimated collection and delivery time was notified to the collection and delivery route calculation module 205 of the mobile terminal 2 through the mobile communication network.

The collection and delivery route calculation module 205 can update the collection and delivery route and the estimated collection and delivery times based on the availability information transmitted from the server 3. That is, when the availability information expressing that the customer at the collection and delivery destination would be absent has been transmitted, the collection and delivery route calculation module 205 again calculates the collection and delivery route and the estimated collection and delivery times so that the collection and delivery destination where the customer would be absent is carried over to an appropriate order, and the delivery staff is directed to a next collection and delivery destination.

Also, the availability information answered by the customer at the collection and delivery destination is not limited only to the information expressing presence or absence, and a time at which the customer having been absent would become present can be included also, for example. In this case, the collection and delivery route calculation module 205 that has received the availability information including the time at which the customer at the collection and delivery destination would become present from the server 3 can also calculate again a carrying over collection and delivery route allowing to remove a collection and delivery destination where the customer is absent once, and to direct the delivery staff to the customer destination at a time at which the customer would become present later and the estimated collection and delivery time.

Also, notification of the information of the estimated collection and delivery time can be also transmitted directly from the mobile terminal 2 to the customer terminal 5 through the mobile communication network. Further, it is also possible that the mobile terminal 2 receives the presence or absence information directly through the mobile communication network, the presence or absence information having been transmitted from the customer terminal 5.

Figure 8:
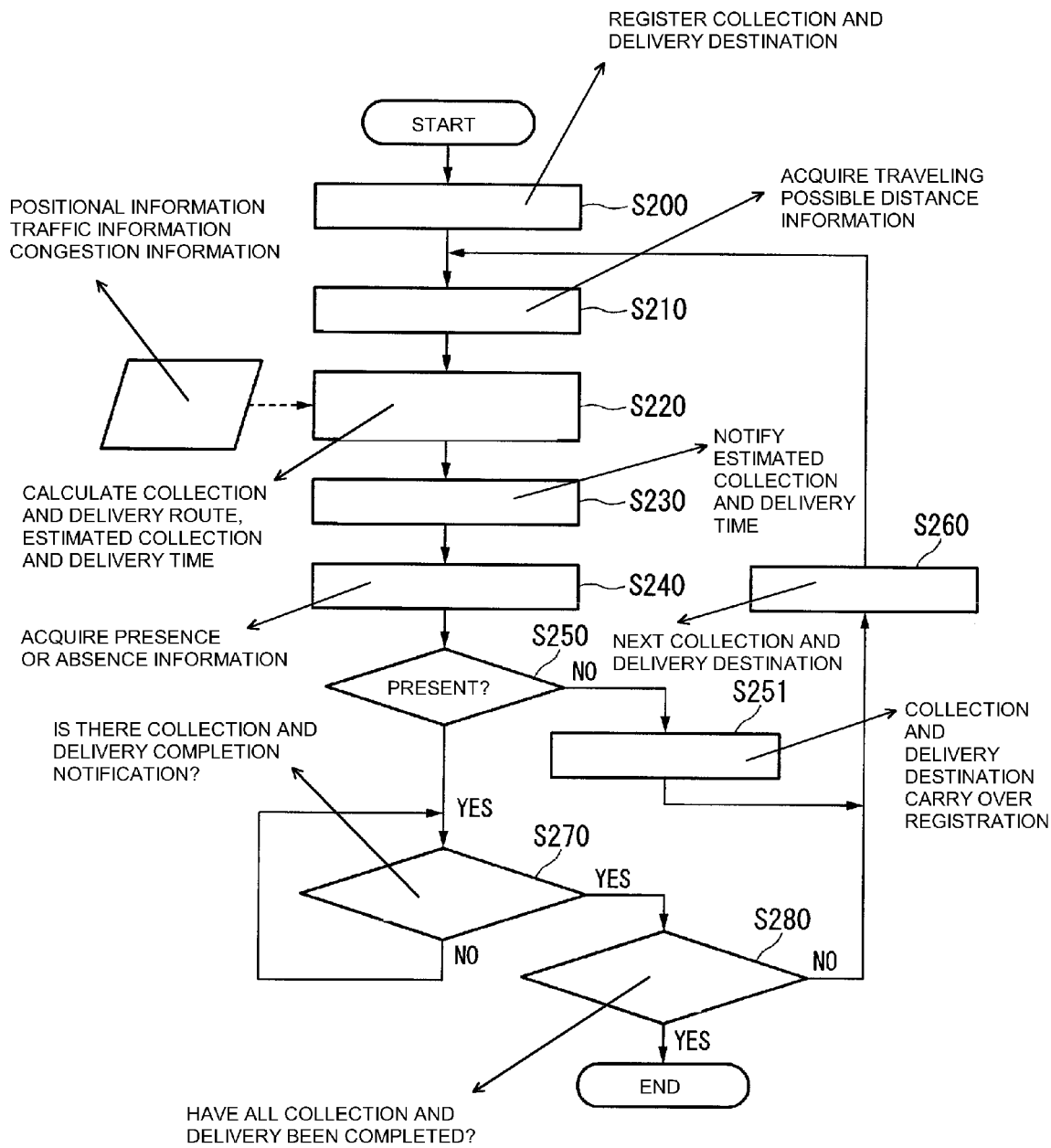
FIG. 8 is a flowchart showing a processing procedure in a collection and delivery support system of the present second embodiment.

Next, a processing procedure in the collection and delivery support system 20 of the present second embodiment will be described. FIG. 8 is a flowchart showing the processing procedure in the collection and delivery support system 20 of the present second embodiment.

In starting collection and delivery utilizing the collection and delivery support system 20, first, in step S200, the collection and delivery managing terminal 4 registers the collection and delivery destination information of all cargos to be collected and delivered this times and the charging location information inside the collection and delivery range where collection and delivery are executed this time or route to the collection and delivery location registration module 201. Thereby, the collection and delivery destination information and the charging location information inside the collection and delivery range registered are outputted to the collection and delivery route calculation module 205. Then, in step S210, the vehicle information acquisition module 202 acquires the possible traveling distance information of the motor-driven two-wheeled vehicle 1, and outputs the possible traveling distance information acquired to the collection and delivery route calculation module 205.

Then, in step S220, the collection and delivery route calculation module 205 calculates a collection and delivery route allowing to return after passing through all collection and delivery destinations included in the collection and delivery destination information inputted from the collection and delivery location registration module 201 based on the traveling possible distance information of the motor-driven two-wheeled vehicle 1 inputted from the vehicle information acquisition module 202. At this time, the collection and delivery route calculation module 205 calculates a collection and delivery route that does not pass through (bypasses) congested routes referring to the present position information of the motor-driven two-wheeled vehicle 1 inputted from the positional information acquisition module 203 and the road information such as the traffic information, congestion information and the like inputted from the road information acquisition module 204. Also, when the travel distance in collection and delivery is longer than the possible traveling distance acquired due to that the collection and delivery range is excessively wide, the collection and delivery route calculation module 205 calculates a collection and delivery route allowing to return after passing through all collection and delivery destinations while executing charging at a charging location arranged in the middle of the collection and delivery route based on the charging location information inputted from the collection and delivery location registration module 201.

Also, in step S220, the collection and delivery route calculation module 205 calculates the estimated collection and delivery time based on the collection and delivery route calculated. Further, the collection and delivery route calculation module 205 outputs the collection and delivery route and the estimated collection and delivery time calculated to the map display module 206. Also, the collection and delivery route calculation module 205 transmits the estimated collection and delivery time calculated to the server 3.

Thereafter, when the collection and delivery route and the estimated collection and delivery time (estimated arrival time) are displayed (presented) on the display part of the mobile terminal 2, the delivery staff starts the collection and delivery service and is headed to the first collection and delivery destination riding the motor-driven two-wheeled vehicle 1.

Then in step S230, the server 3 notifies the customer of the information of the estimated collection and delivery time transmitted from the collection and delivery route calculation module 205 of the mobile terminal 2. Then, in step S240, when the server 3 acquires the availability information transmitted from the customer terminal 5, the server 3 transmits the availability information acquired to the collection and delivery route calculation module 205 of the mobile terminal 2.

Then, in step S250, the collection and delivery route calculation module 205 confirms the availability information transmitted from the server 3. Also, when the availability information expresses that the customer of the collection and delivery destination of this time is absent (NO of step S250), in step 251, the server 3 registers the collection and delivery destination of this time so as to be carried over, goes to step S260 to start the process of the collection and delivery work of cargos to a next collection and delivery destination, and executes the processes of step S210 to step S240 shown in FIG. 8 again. Thereby it is possible to carry over the collection and delivery destination where the customer is absent to an appropriate order and to direct the delivery staff to head to the next collection and delivery destination. Also, when there is a returning time in the availability information, the time is taken into consideration in carry over registration, whereas when there is no returning schedule on that day, notification of later date delivery is given to the customer terminal 5 from the server 3, and the collection and delivery destination is deleted from a collection and delivery destination list (collection and delivery destination information) of the day.

Also, when the availability information expresses that the customer at the collection and delivery destination of this time is present in step S250 (YES of step S250), the collection and delivery route calculation module 205 waits for completion of the first collection and delivery work by the delivery staff in step S270 (NO of step S270). Also, in step S250, even when the availability information has not been transmitted from the server 3, "YES" is determined, and the process goes to step S270. When the delivery staff arrives at a collection and delivery destination and completes the collection and delivery work, the delivery staff operates the mobile terminal 2 for example, and notifies the collection and delivery route calculation module 205 of an event that the collection and delivery work at the first collection and delivery destination has been completed.

When the notification that the collection and delivery work by the delivery staff has been completed is received (YES of step S270), in step S280, the collection and delivery route calculation module 205 determines whether or not the collection and delivery service of this time or route, that is, the collection and delivery work of all cargos, has been completed. When it is determined that the collection and delivery work of all cargos has been completed in step S280 (YES of step S280), the process of the collection and delivery service of this time or route is completed. Also, when it is determined that the collection and delivery work of all cargos has not been completed in step S280 (NO of step S280), in step S260, the collection and delivery route calculation module 205 starts the process of the collection and delivery work of cargos to the next collection and delivery destination, and repeats the processes of step S210 to step S280 shown in FIG. 8.

Also, in step S210 to step S280 shown in FIG. 8, each of the positional information acquisition module 203 and the road information acquisition module 204 can acquire each information regularly or at all times. Thereby, the collection and delivery route calculation module 205 can update the collection and delivery route and the estimated collection and delivery time regularly or at all times. Further, the collection and delivery route calculation module 205 can be constituted so that, only when a collection and delivery route and estimated collection and delivery time different from the collection and delivery route and the estimated collection and delivery times calculated last time have been calculated, the collection and delivery route and the estimated collection and delivery times newly calculated are outputted to the map display module 206, and the estimated collection and delivery times newly calculated are transmitted to the server 3.

Figure 9:
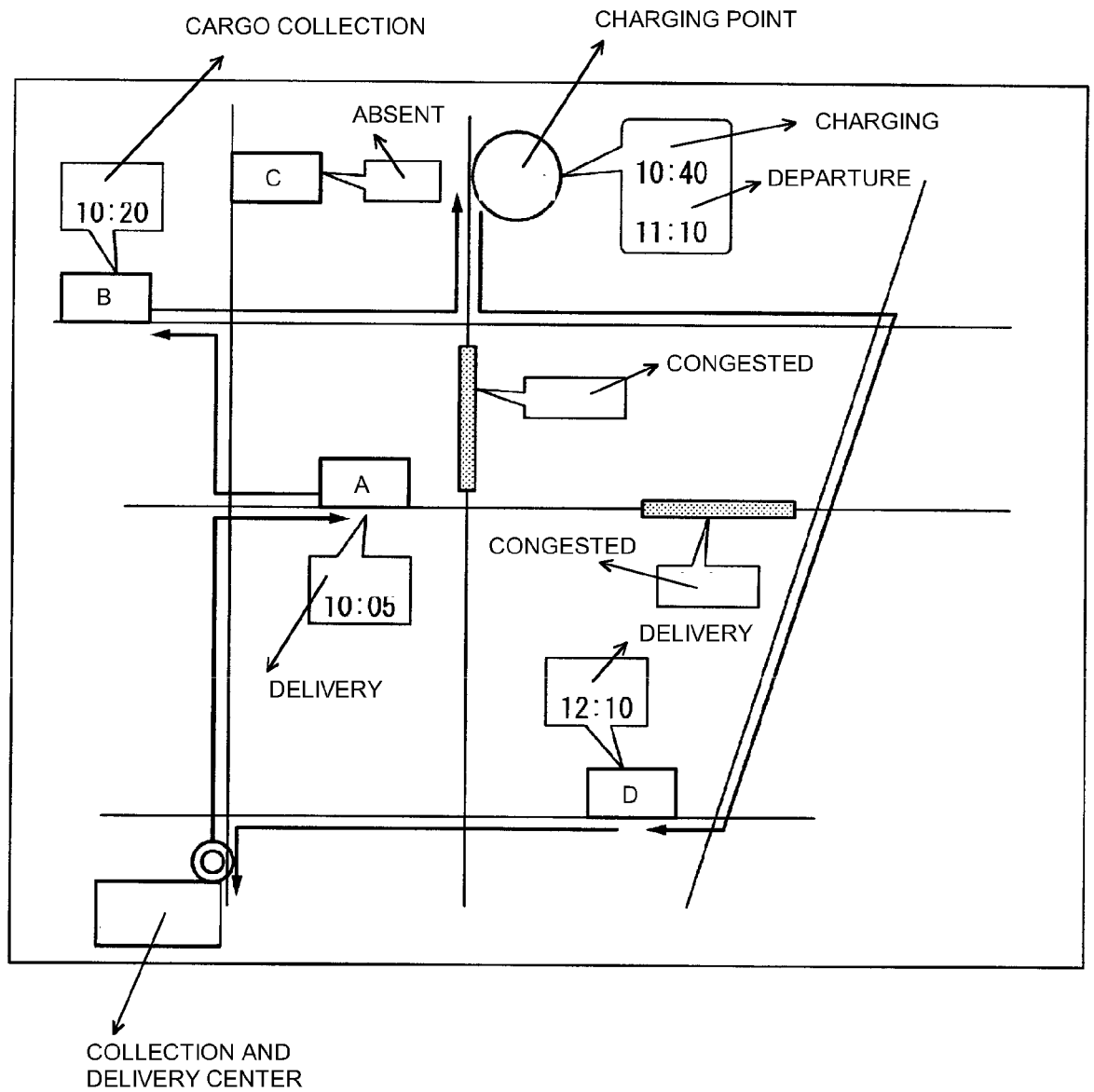
FIG. 9 is a drawing showing an example of a method for producing a collection and delivery route in a collection and delivery support system of the present second embodiment.

Here, an example of a case where the collection and delivery route is displayed on the display part of the mobile terminal 2 arranged in the motor-driven two-wheeled vehicle 1 will be described. FIG. 9 is a drawing showing an example of a method for presenting a collection and delivery route in the collection and delivery support system 20 of the present second embodiment. Also, in an example of a presenting method shown in FIG. 9, shown is an example of a display screen of a case where the collection and delivery route is displayed on the display part, or is presented to the delivery staff, on the navigation function possessed by the mobile terminal 2 itself in a superimposing manner.

In an example of a display screen shown in FIG. 9, the information on the collection and delivery route and the estimated collection and delivery time calculated, the availability information of each collection and delivery destination, and the congestion information are shown on the display of the map in the navigation function in a superimposing manner. In an example of the display screen of FIG. 9, a case is displayed in which collection and delivery are executed in the order of "Mr. A"→"Mr. B"→"charging point"→"Mr. D", and collection and delivery are not executed this time for "Mr. C" because of absence. Also, a section shown by half-dot meshing on the display screen shown in FIG. 9 expresses a portion where congestion occurs in the congestion information acquired by the road information acquisition module 204, and the collection and delivery route bypassing the portion where the congestion occurs is calculated and displayed.

As described above, in the collection and delivery support system 20 of the present second embodiment, similarly to the collection and delivery support system 10 of the first embodiment, the collection and delivery route taking the charging locations arranged within the collection and delivery range into consideration is calculated based on the traveling possible distance information of the motor-driven two-wheeled vehicle 1 acquired by the mobile terminal 2. Thereby, in the collection and delivery support system 20 of the present second embodiment, effects similar to those of the collection and delivery support system 10 of the first embodiment can be obtained.

Also, in the collection and delivery support system 20 of the present second embodiment, the collection and delivery route and the estimated collection and delivery time are calculated within the mobile terminal 2 taking the road information such as the traffic information, congestion information and the like and the state whether or not the customer at the collection and delivery destination is absent also into consideration. Thereby, in the collection and delivery support system 20 of the present second embodiment, a collection and delivery route can be calculated by which collection and delivery can be executed efficiently while the travel distance of the motor-driven two-wheeled vehicle 1 is made not exceed the possible traveling distance according to the residual quantity of the electric power stored in the battery 120 of the motor-driven two-wheeled vehicle 1.

Further, in the collection and delivery support system 10 of the first embodiment also, the server 3 notifies the customers of the information of the estimated collection and delivery times calculated. In this case, in the collection and delivery support system 10 of the first embodiment also, similarly to the collection and delivery support system 20 of the present second embodiment, the collection and delivery route and the estimated collection and delivery time can be updated to those carrying over the collection and delivery destinations where the customers are absent based on the availability information transmitted from the customer terminals 5 to which the information of the estimated collection and delivery time was notified.

Also, the method for presenting the collection and delivery route in the collection and delivery support system 20 of the present second embodiment is not limited to that of such a style as an example of the display screen shown in FIG. 9, and it can also be made, for example, a display screen similar to an example of the display screen of the collection and delivery support system 10 of the first embodiment shown in FIG. 6.

As described above, according to the embodiments of the present invention, a collection and delivery route is presented which is according to a traveling possible distance over which a saddle-ride type electric vehicle can travel taking the residual quantity of electric power stored in a battery mounted on the saddle-ride type electric vehicle into consideration. Also, according to the embodiments of the present invention, even when the travel distance of the collection and delivery route exceeds the traveling possible distance over which the saddle-ride type electric vehicle can travel given the residual power in its battery, a collection and delivery route is presented which allows to return after passing through all collection and delivery destinations by executing charging at a charging location arranged within the collection and delivery range in the middle of the collection and delivery route. Thereby, in the embodiments of the present invention, a collection and delivery support system can be provided in which delivery agents can reliably utilize saddle-ride type electric vehicles for collection and delivery of cargos.

Also, in the collection and delivery support system 20 of the present second embodiment, a constitution of a case where the road information acquisition module 204 and the collection and delivery route calculation module 205 were provided within the mobile terminal 2 was described, however, the present invention is not limited to the constitution. For example, such a constitution is also possible in which the road information acquisition module 204 and the collection and delivery route calculation module 205 shown in FIG. 7 so as to be surrounded by a dotted line are provided within the server 3. In this case, the collection and delivery managing terminal 4 and the server 3 exchange the collection and delivery destination information and the charging location information directly with each other as an arrow of a dotted line shown in FIG. 7, and the server 3 transmits the collection and delivery route calculated to the mobile terminal 2.

Also, in the present invention, as means for presenting the collection and delivery route, a mobile terminal such as a smart phone and the like are utilized. In the smart phone, sensors acquiring various kinds of information are provided other than a position sensor such as a GPS and the like utilized by the navigation function. Accordingly, in the collection and delivery support system of the present invention also, various functions which delivery agents can utilize can be achieved.

Additional Function

Here, an example of additional functions in the collection and delivery support system of the embodiments of the present invention will be described. In the description below, as an example of the additional functions in the collection and delivery support system of the embodiments of the present invention, an example of a warning system will be described which is for urging the delivery staff riding the motor-driven two-wheeled vehicle 1 to pay attention to locations to be bypassed such as a location where an accident rate is high and the like. FIG. 10 is a block diagram showing an outline of a system constitution in a warning system that is an example of the additional functions of the collection and delivery support system according to an embodiment of the present invention.

A warning system 30 of the present embodiment can be added to the collection and delivery support system 10 or the collection and delivery support system 20 by utilizing sensors provided in the mobile terminal 2 that is a constitutional element of the collection and delivery support system 10 by the first embodiment or the collection and delivery support system 20 by the second embodiment. Also, the warning system 30 of the present embodiment can be operated in parallel with calculation of the collection and delivery route and the estimated collection and delivery times in the collection and delivery support system 10 by the first embodiment or the collection and delivery support system 20 by the second embodiment.

In the description below, in the system constitution in the warning system 30 of the present embodiment, for a constitutional element similar to that in the collection and delivery support system 10 of the first embodiment shown in FIG. 3 or the collection and delivery support system 20 of the second embodiment shown in FIG. 7, a same reference sign will be used.

The warning system 30 of the present embodiment is composed of the portable terminal 2 and the server 3. Also, similarly to the collection and delivery support system 10 of the first embodiment and the collection and delivery support system 20 of the second embodiment, the mobile terminal 2 is connected to the ECU 140 provided in the motor-driven two-wheeled vehicle 1 (refer to FIG. 4). Accordingly, detailed description on connection between the ECU 140 provided in the motor-driven two-wheeled vehicle 1 and the mobile terminal 2 will be omitted.

To the server 3, information on locations to be bypassed such as locations where an accident rate is high, speed limit sections, uneven road locations and the like (hereinafter referred to as "bypass information") is registered from time to time by information from the road information server and respective mobile terminals described below. Also, the server 3 transmits the bypass information registered around the motor-driven two-wheeled vehicle 1 to the mobile terminal 2 through the mobile communication network based on the present position information of the motor-driven two-wheeled vehicle 1 transmitted from the mobile terminal 2.

Similarly to the collection and delivery support system 10 of the first embodiment and the collection and delivery support system 20 of the second embodiment, the mobile terminal 2 is a portable terminal (smart phone) combining functions of a cellular phone utilizing an existing mobile communication network and functions of a portable information terminal (PDA).

The mobile terminal 2 acquires the present position information of the motor-driven two-wheeled vehicle 1 from the position sensor such as the GPS provided in the mobile terminal 2 itself, and transmits the present position information of the motor-driven two-wheeled vehicle 1 acquired to the server 3 through the mobile communication network. Also, the mobile terminal 2 acquires information of the travel state at present of the motor-driven two-wheeled vehicle 1 from the various kinds of sensors provided in the mobile terminal 2 itself, and transmits the information of the travel state of the motor-driven two-wheeled vehicle 1 acquired to the server 3 through the mobile communication network. Further, in the description below, description will be given with the provision that, as the information of the travel state of the motor-driven two-wheeled vehicle 1, unevenness information of the road surface on which the motor-driven two-wheeled vehicle 1 travels and information of the speed of the motor-driven two-wheeled vehicle 1 are acquired and transmitted.

Also, the mobile terminal 2 urges the delivery staff riding the motor-driven two-wheeled vehicle 1 to pay attention in traveling by displaying a display according to the bypass information transmitted from the server 3 on the display part provided in the mobile terminal 2.

As shown in FIG. 10, the mobile terminal 2 includes a position sensor 207, a sensor 210, a bypass area determination module 208 and a warning display module 209. Also, the sensor 210 includes a gyro sensor 211, an acceleration sensor (G sensor) 212, and a speed calculation unit (V calculation unit) 213. Further, the respective modules provided in the mobile terminal 2 are software modules for achieving an application that provides a user of the mobile terminal 2, that is, the delivery staff, with the function of the warning system 30 of the present embodiment, however, the respective modules are not limited to them, and may be hardware modules that achieve the functions of the respective modules.

The position sensor 207 detects the present position of the motor-driven two-wheeled vehicle 1, and outputs the information of the present position (present position information) detected to the bypass area determination module 208.

The gyro sensor 211 detects unevenness of the road surface by detecting the angle of the mobile terminal 2, and outputs information of the unevenness of the road surface (hereinafter referred to as "road surface unevenness information") detected to the bypass area determination module 208.

The acceleration sensor 212 detects vibration of the motor-driven two-wheeled vehicle 1 by detecting acceleration of the mobile terminal 2, and outputs information of the vibration of the motor-driven two-wheeled vehicle 1 (hereinafter referred to as "vehicle body vibration information") detected to the bypass area determination module 208.

Also, the position sensor 207, the gyro sensor 211 and the acceleration sensor 212 may be accessories outside the mobile terminal 2 and those conveying information to the mobile terminal 2 or those conveying information that reinforces information of sensors inside the mobile terminal 2.

The speed calculation unit 213 detects speed of the motor-driven two-wheeled vehicle 1 by calculating the speed based on the present position information from the position sensor 207 for example, and outputs the information of the speed of the motor-driven two-wheeled vehicle 1 (hereinafter referred to as "vehicle body speed information") detected to the bypass area determination module 208. Also, in the collection and delivery support system of the embodiments of the present invention (the collection and delivery support system 10 of the first embodiment and the collection and delivery support system 20 of the second embodiment), the mobile terminal 2 is connected to the ECU 140 provided in the motor-driven two-wheeled vehicle 1. Accordingly, a constitution is also possible in which, instead that the speed calculation unit 213 detects the speed of the motor-driven two-wheeled vehicle 1, the mobile terminal 2 acquires information of the speed of the motor-driven two-wheeled vehicle 1 outputted from a velocity (speed) sensor not shown provided in the motor-driven two-wheeled vehicle 1 through the ECU 140 and outputs the information of the speed of the motor-driven two-wheeled vehicle 1 acquired to the bypass area determination module 208 as the vehicle speed information.

The mobile terminal 2 transmits each of the present position information outputted by the position sensor 207, the road surface unevenness information outputted by the gyro sensor 211 inside the sensor 210, the vehicle body vibration information outputted by the acceleration sensor 212, and the vehicle body speed information outputted by the speed calculation unit 213, or the bypass conditions with respect to recommended routes to the server 3 through the mobile communication network. Also, in the description below, the road surface unevenness information, vehicle body vibration information and vehicle body speed information are collectively referred to as "travel state information".

Further, the position sensor 207 detects the present position of the motor-driven two-wheeled vehicle 1 regularly or at all times. Thereby, the warning system 30 of the present embodiment can update the travel position of the motor-driven two-wheeled vehicle 1 in the collection and delivery route regularly or at all times. Also, each of the gyro sensor 211, the acceleration sensor 212 and the speed calculation unit 213 detects the travel state of the motor-driven two-wheeled vehicle 1 at all times. Thereby, the warning system 30 of the present embodiment can monitor the travel state of the motor-driven two-wheeled vehicle 1 at all times. Also, avoidance requirement information transmitting means that conveys information to the server 3 by operation of the delivery staff at a location to be bypassed may be arranged in the mobile terminal 2.

Based on the travel state information transmitted from the mobile terminal 2, the server 3 determines whether or not the location is a new location to be bypassed that should be registered in addition to the locations to be bypassed that are registered at present. Also, the server 3 pinpoints the location having been determined to be the new location to be bypassed which should be additionally registered based on the present position information transmitted from the portable terminal 2, and registers it additionally as new bypass information.

Further, determination whether or not a new location to be bypassed by the server 3 is executed by behavior of the motor-driven two-wheeled vehicle 1 traveling at present. For example, when a state that unevenness of the road surface according to the road surface unevenness information included in the travel state information is different from an ordinary travel state lasts for a predetermined time or more, the location is determined to be a location where a rough road surface to be bypassed has been generated, and is additionally registered as an uneven road location. Also, for example, when a state that vibration of the motor-driven two-wheeled vehicle 1 according to the vehicle body vibration information included in the travel state information becomes vibration different from the travel state of traveling on a flat road lasts for a predetermined time or more, the location is additionally registered as a speed limit section where travel speed should be watched in order to protect cargos loaded on the motor-driven two-wheeled vehicle 1 from vibration.

Based on the present position information outputted by the position sensor 207, the bypass area determination module 208 determines whether or not an area traveling at present is an area where the location to be bypassed registered in the server 3 is present. Also, when the area traveling at present has been determined to be an area where the location to be bypassed is present, the bypass information transmitted from the server 3 is outputted to the warning display module 209.

Further, based on the vehicle body speed information outputted by the speed calculation unit 213, the bypass area determination module 208 determines the speed at which the motor-driven two-wheeled vehicle 1 travels. Also, when the speed of traveling at present exceeds a predetermined travel speed or a travel speed in the speed limit section, information expressing that the travel speed has exceeded the speed limit (hereinafter referred to as "overspeed information") is outputted to the warning display module 209.

Based on the bypass information or the overspeed information inputted from the bypass area determination module 208, the warning display module 209 urges the delivery staff riding the motor-driven two-wheeled vehicle 1 to pay attention in traveling by displaying a display for warning (hereinafter referred to as "warning display") on the display part provided in the mobile terminal 2 itself.

Next, a processing procedure in the warning system 30 of the present embodiment will be described. FIG. 11 is a flowchart showing a processing procedure in the warning system 30 that is an example of additional functions of the collection and delivery support system of the present embodiment.

When warning utilizing the warning system 30 is started and the mobile terminal 2 detects start of movement of the motor-driven two-wheeled vehicle 1 by the speed calculation unit 213 for example, first, in step S300, the position sensor 207 detects the present position of the motor-driven two-wheeled vehicle 1 and outputs the present position information to the bypass area determination module 208. Also, the mobile terminal 2 transmits the present position information of the motor-driven two-wheeled vehicle 1 detected by the position sensor 207 to the server 3. Thereafter, the server 3 transmits the bypass information registered around a location shown in the present position information transmitted from the mobile terminal 2 to the mobile terminal 2.

Then, in step S310, respective sensors inside the sensor 210 monitor the travel state of the motor-driven two-wheeled vehicle 1. Also, the respective sensors inside the sensor 210 output the travel state information detected to the bypass area determination module 208.

Then, in step S320, based on the vehicle body speed information included in the travel state information inputted, the bypass area determination module 208 determines whether or not the travel speed at present of the motor-driven two-wheeled vehicle 1 is a predetermined speed or below. This new determination of the travel speed is executed, for example, by comparing the limit speed of the map information in the navigation function possessed by the mobile terminal 2 and the travel speed at present, and the like. Also, it is executed, for example, by comparing the limit speed of the speed limit section included in the bypass information transmitted from the server 3 and the travel speed at present, and the like.

When the travel speed at present of the motor-driven two-wheeled vehicle 1 is not a predetermined speed or below in step S320 (NO of step S320), the process goes to step S330, and the overspeed information is outputted to the warning display module 209. Also, the warning display module 209 executes warning display (speed warning display) according to the overspeed inputted from the bypass area determination module 208, and urges the delivery staff riding the motor-driven two-wheeled vehicle 1 to pay attention to the travel speed. Further, when the travel speed at present of the motor-driven two-wheeled vehicle 1 is a predetermined speed or below in step S320 (YES of step S320), the process goes to step S340.

Then, in step S340, the bypass area determination module 208 determines whether or not registered data that expresses to be the location to be bypassed such as a location where an accident rate is high, and an uneven road location and the like are included in the bypass information transmitted from the server 3.

When the registered data that expresses to be the location to be bypassed are included in the bypass information transmitted from the server 3, that is, a location to be bypassed is present around the travel position at present of the motor-driven two-wheeled vehicle 1 in step 340 (YES of step S340), the process goes to step S350, and the bypass information (registered data of the object) is outputted to the warning display module 209. Also, the warning display module 209 executes warning display (travel warning display) according to the bypass information inputted from the bypass area determination module 208, and urges the delivery staff riding the motor-driven two-wheeled vehicle 1 to pay attention to the locations to be bypassed.

Further, when the registered data that expresses to be the location to be bypassed are not included in the bypass information transmitted from the server 3, that is, a location to be bypassed is not present around the travel position at present of the motor-driven two-wheeled vehicle 1 in step S340 (NO of step S340), the process goes to step S360.

Then, in step S360, based on the travel state information (road surface unevenness information, vehicle body vibration information and vehicle body speed information) inputted, the bypass area determination module 208 determines whether or not the location where the motor-driven two-wheeled vehicle 1 travels at present is a location where rough road surface to be bypassed has been generated, that is, an uneven road.

When the location the motor-driven two-wheeled vehicle 1 is traveling at present is not an uneven road in step S360 (NO of step S360), the registered data registered in the bypass information are deleted in step S370, the process returns to step S300, and the process of warning of step S300 to step S360 shown in FIG. 11 is repeated.

Also, when the location the motor-driven two-wheeled vehicle 1 is traveling at present is an uneven road in step S360 (YES of step S360), the process goes to step S380, and the travel state information (road surface unevenness information, vehicle body vibration information, and vehicle body speed information) having been determined to be an uneven road is transmitted to the server 3 as registered data of new location to be bypassed. Thereby, based on the travel state information having been transmitted from the mobile terminal 2, the server 3 determines whether or not the location is a new location to be bypassed that should be registered in addition to the bypass information registered at present, whereas when the location is determined to be a new location to be bypassed, the new bypass information according to the travel state information having been transmitted this time is additionally registered to the bypass information registered at present. Also, the process returns to step S300, and the process of warning of step S300 to step S360 shown in FIG. 11 is repeated.

Further, in step S300 to step S380 shown in FIG. 11, each of the position sensor 207 and the sensor 210 (the gyro sensor 211, the acceleration sensor 212, and the speed calculation unit 213) executes each detection regularly or at all times. Thereby, the bypass area determination module 208 can urge the delivery staff riding the motor-driven two-wheeled vehicle 1 to pay attention regularly or at all times. Also, the server 3 can update the bypass information at all times based on the travel state information transmitted from the mobile terminal 2.

Here, an example of a case where the warning display for urging the delivery staff riding the motor-driven two-wheeled vehicle 1 to pay attention is displayed on the display part of the mobile terminal 2 will be described. FIG. 12 is a drawing showing an example of a method for displaying warning in the warning system 30 that is an example of additional functions of the collection and delivery support system of the present embodiment. Also, an example of a display method shown in FIG. 12 shows an example of a display screen of a case where the warning display is displayed on the display part in a superimposing manner when the portable terminal 2 presents the collection and delivery route in the collection and delivery support system 10 of the first embodiment shown in FIG. 6.

Figure 12A:
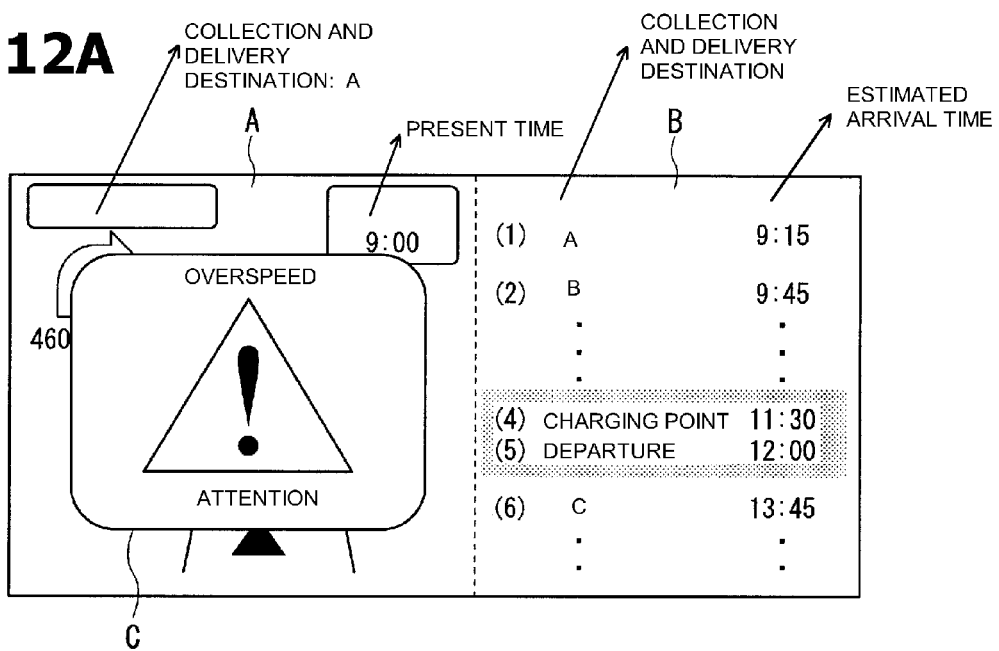
FIG. 12A is a drawing showing an example of a method for displaying warning in an example of additional functions of a collection and delivery support system of the present embodiment—depicting a travel warning display C of "OVERSPEED" expressing that the travel speed of vehicle exceeds the speed limit.

In an example of a display screen shown in FIG. 12A, a travel warning display C of "OVERSPEED" expressing that the travel speed of the motor-driven two-wheeled vehicle 1 exceeds the speed limit is displayed superimposed on the display region A that displays information of the collection and delivery route superimposed on the navigation function.

Figure 12B:
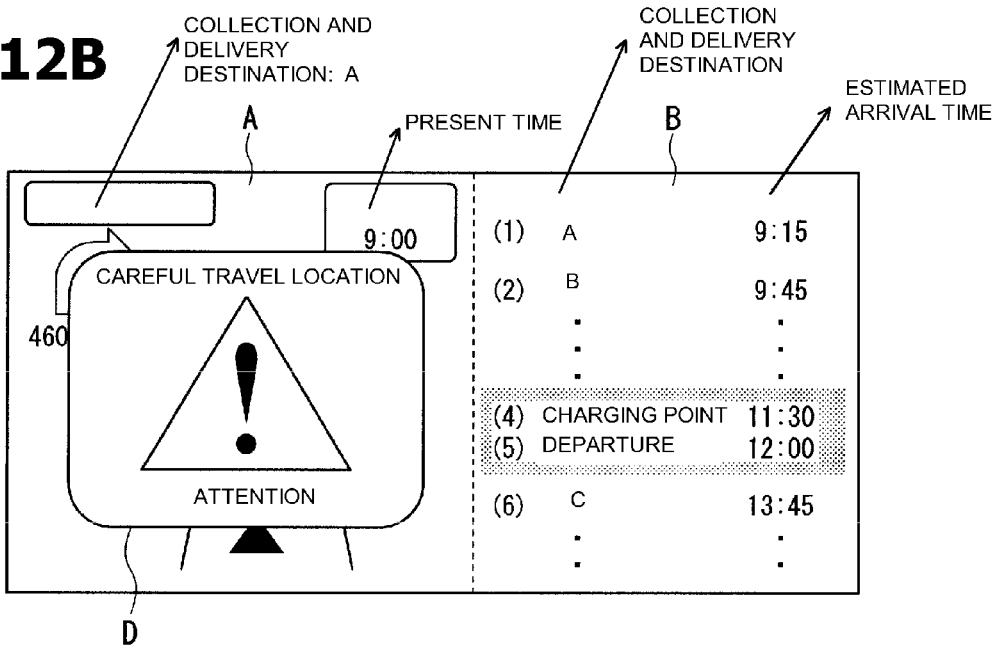
FIG. 12B is a drawing showing an example of a method for displaying warning in an example of additional functions of a collection and delivery support system—displaying a travel warning display D of "CAREFUL TRAVEL LOCATION".

Also, in an example of a display screen shown in FIG. 12B, a travel warning display D of "CAREFUL TRAVEL LOCATION" is displayed superimposed on the display region A that displays information of the collection and delivery route superimposed on the navigation function when the registered data that expresses to be a location to be bypassed such as a location where an accident rate is high, an uneven road location and the like are included as the registered data included in the bypass information.

Also, the warning display can also be displayed superimposed on the display screen that presents the collection and delivery route in the collection and delivery support system 20 of the second embodiment shown in FIG. 9. In this case, similarly to an example of the display method shown in FIGS. 12A, 12B, it is possible to display the warning display so as to be superimposed on the entire display screen (entire display region A in FIGS. 12A, 12B), however, it is also possible to display the warning display so that the delivery staff can recognize which section of the collection and delivery route is the location to be bypassed by superimposing the warning display whose size has been changed (has been made small) on the collection and delivery route displayed.

As described above, in the warning system 30 that is an example of additional functions in the collection and delivery support system of the embodiments of the present invention, whether a location that is registered in the server 3 and was determined to be a location to be bypassed in the past or not is determined based on the travel position information of the motor-driven two-wheeled vehicle 1 acquired by the mobile terminal 2. Thereby, it is possible to notify the delivery staff riding the motor-driven two-wheeled vehicle 1 who travels, at present, the location that was determined to be a location to be bypassed in the past of being the location to be bypassed, and collection and delivery can be executed more safely.

Also, in the warning system 30 that is an example of the additional functions in the collection and delivery support system of the embodiments of the present invention, the location to be bypassed such as an uneven road point and the like is determined based on the travel state information of the motor-driven two-wheeled vehicle 1 acquired by the mobile terminal 2. Further, the location is additionally registered to the server 3 as a new location to be bypassed. Thereby, it is possible to notify the delivery staff riding the motor-driven two-wheeled vehicle 1 who will pass through the same location next of being the location to be bypassed, and collection and delivery can be executed safely.

Further, in the collection and delivery support system 10 according to the first embodiment or the collection and delivery support system 20 according to the second embodiment, it is also possible to calculate the collection and delivery route using the bypass information as a reference. For example, when a location to be bypassed where cargos may be broken due to vibration is included in the collection and delivery route calculated, it is also possible to change it to a collection and delivery route heading to a collection and delivery destination bypassing the location. At this time, the bypass information used as a reference may be selected according to the kind of the cargos loaded on the motor-driven two-wheeled vehicle 1.

Also, the warning system 30 that is an example of the additional functions in the collection and delivery support system of the embodiments of the present invention can also output the vehicle body speed information from the speed calculation unit 213 provided in the mobile terminal 2. That is, the process of warning by the warning system 30 can be executed even when the mobile terminal 2 is not connected to the ECU 140 provided in the motor-driven two-wheeled vehicle 1. Accordingly, a saddle-ride type vehicle to which the warning system 30 can be applied is not limited to the motor-driven two-wheeled vehicle 1, and the warning system 30 can be applied also to a saddle-ride type vehicle driven by an engine. Further, information of the locations to be bypassed can be shared also with riders of saddle-ride type vehicles other than riders of delivery agents.

Also, in the present embodiment, with respect to connection between the ECU 140 provided in the motor-driven two-wheeled vehicle 1 and the mobile terminal 2, an example of connection by wiring utilizing a connector was shown, however a method for connecting the ECU 140 and the mobile terminal 2 is not limited to the embodiments of the present invention. For example, the ECU 140 and the mobile terminal 2 can be constituted so as to be connected to each other by short distance radio communication such as a Bluetooth (registered trade mark) and the like and a wireless LAN such as WiFi (registered trade mark) and the like for example. Further, it can be also constituted to execute non-contact charging and communication utilizing electromagnetic induction such as the WPC standards and the like for example.

Also, the saddle-ride type electric vehicle to which the collection and delivery support system of the embodiments of the present invention can be applied is not limited to a saddle-ride type electric vehicle of a scooter type having a low floor described in the embodiment (the motor-driven two-wheeled vehicle 1). For example, the saddle-ride type electric vehicle includes all vehicles where a rider rides straddling a vehicle body, and not only a two-wheeled vehicle but also a three-wheeled vehicle having one front wheel and two rear wheels, a three-wheeled vehicle having two front wheels and one rear wheel, and a four-wheeled vehicle are included in the saddle-ride type electric vehicle to which the collection and delivery support system of the embodiments of the present invention can be applied.

Also, in the present embodiment, the case where a smart phone was utilized as the mobile terminal 2 was described, however the portable terminal in the collection and delivery support system of the embodiments of the present invention is not limited to the smart phone utilized in the present embodiment. For example, a so-called tablet terminal including a touch panel which is larger than that of a smart phone in general can also be utilized as a mobile terminal in the collection and delivery support system.

Further, various processes described above in relation with the collection and delivery service using the collection and delivery support system may be executed by recording a program for achieving processing by the server 3 and the collection and delivery managing terminal 4 which are constitutional elements of the collection and delivery support system 10 according to the first embodiment or the collection and delivery support system 20 according to the second embodiment in a computer readable recording medium, making a computer system read the program recorded in the recording medium and executing the program. Also, "computer system" mentioned here may be one that includes an OS and hardware such as a peripheral device and the like. Further, "computer system" is to include home page provision environment (or display environment) if it uses the WWW system. Also, "computer readable recording medium" means a memory device such as a writable nonvolatile memory such as a flexible disc, magneto-optical disk, ROM, flush memory and the like, a portable medium such as a CD-ROM and the like, a hard disk incorporated in a computer system, and the like.

Furthermore, "computer readable recording medium" is to also include one holding a program for a constant time such as a volatile memory (DRAM (Dynamic Random Access Memory) for example) inside a computer system that becomes a server and a client when the program is transmitted through a network such as the internet and the like and a communication line such as a telephone line and the like. Also, the program may be transmitted from a computer system that sores the program in a memory device and the like to another computer system through a transmission medium or by a transmission wave inside the transmission medium. Here, "transmission medium" transmitting the program means a medium having a function of transmitting information such as a network (communication network) such as the internet and the like and a communication channel (communication line) such as a telephone line and the like. Also, the program may be one for achieving a part of the functions described above. Further, it may be one that can achieve the functions described above by combination with a program already recorded in the computer system, that is, a so-called difference file (difference program).

The embodiments of the present invention have been described above referring to the drawings, however specific constitutions are not limited to the embodiments, and various alterations within a range not departing from the object of the present invention are also included.

REFERENCE SIGNS LIST

1 . . . Motor-driven two-wheeled vehicle (saddle-ride type electric vehicle)
104 . . . Swing arm (power engine)
120 . . . Battery
131 . . . Electric motor
140 . . . ECU (battery residual quantity detection means)
160 . . . BMU (battery residual quantity detection means)
10, 20 . . . Collection and delivery support system
2 . . . mobile terminal
201 . . . Collection and delivery location registration module
202 . . . Vehicle information acquisition module
203 . . . Positional information acquisition module
204 . . . Road information acquisition module
205 . . . Collection and delivery route calculation module (route calculating means)
206 . . . Map display module
207 . . . Position sensor
208 . . . Bypass area determination module
209 . . . Warning display module
210 . . . Sensor
211 . . . Gyro sensor
212 . . . Acceleration sensor
213 . . . Speed calculation unit
3 . . . Server (route calculating means, bypass information server)
4 . . . Collection and delivery managing terminal (collection and delivery destination registering means)
5 . . . Customer terminal
6 . . . Road information server
30 . . . Warning system

We claim:

1. A collection and delivery support system that displays a travel route used in collecting and delivering cargos on a mobile terminal attached to a vehicle body of an electric vehicle that includes a battery and a battery-driven electric motor in a power unit, the collection and delivery support system comprising:
a collection and delivery destination register that registers information on respective collection and delivery destinations of the cargos, and information of charging locations which are located within a range where the cargos are to be collected and delivered and where the battery can be charged, and outputs the registered information on the collection and delivery destinations and on the charging locations;
a route calculator that calculates a route passing, in order, the respective collection and delivery destinations inputted from the collection and delivery destination register relative to a possible traveling distance over which the electric vehicle can travel; and
a residual battery power sensor that detects a residual quantity of electric power stored in the battery and outputs information on the detected residual quantity of electric power, which relates to the possible traveling distance, to the mobile terminal;
wherein the route calculator calculates the route such that the route includes at least one of the charging locations in the middle thereof based on the registered information and the possible traveling distance, and calculates estimated collection and delivery times at which the cargos are to be collected and delivered at the respective collection and delivery destinations based on the route calculated.

2. The collection and delivery support system according to claim 1, wherein the mobile terminal transmits the information relating to the possible traveling distance to the route calculator through a mobile communication network; and the route calculator calculates the route for the vehicle and the estimated collection and delivery times based on the information on the collection and delivery destinations and the information on the charging locations inputted from the collection and delivery destination register, and transmits the calculated route and the estimated collection and delivery times to the mobile terminal through the mobile communication network.

3. The collection and delivery support system according to claim 2, wherein the mobile terminal further transmits information on a position of the mobile terminal to the route calculator through the mobile communication network; and the route calculator updates the route and the estimated collection and delivery times based on the information on the position of the mobile terminal, and transmits the updated route and the estimated collection and delivery times to the mobile terminal through the mobile communication network.

4. The collection and delivery support system according to claim 3, wherein the route calculator transmits the information on the estimated collection and delivery times calculated to customer terminals associated with respective ones of the collection and delivery destinations.

5. The collection and delivery support system according to claim 4, wherein the route calculator receives information on availability transmitted from the customer terminals expressing a customer's presence or absence at the associated collection and delivery destination at the estimated collection and delivery time, and, when the information on availability indicates that the customer will be absent at the estimated collection and delivery time, calculates a new route that carries over the collection and delivery destination of the associated customer terminal that has transmitted the information on availability.

6. The collection and delivery support system according to claim 3, further comprising a bypass information server which registers information on locations to be bypassed; and wherein the mobile terminal includes a sensor that detects a travel state of the electric vehicle, transmits information on the detected travel state of the electric vehicle to the bypass information server, and displays a warning according to information on the locations to be bypassed transmitted from the bypass information server, in a superimposing manner on displayed results of the route and the estimated collection and delivery times.

7. The collection and delivery support system according to claim 3, wherein the mobile terminal includes a sensor which detects a travel speed of the electric vehicle, and, if the detected travel speed of the electric vehicle is a predetermined threshold or more, outputs a command of lowering speed of the electric vehicle to a controller that is provided in the electric vehicle and controls the speed of the electric vehicle.

8. The collection and delivery support system according to claim 2, wherein the route calculator transmits the information on the estimated collection and delivery times calculated to customer terminals associated with respective ones of the collection and delivery destinations.

9. The collection and delivery support system according to claim 8, wherein the route calculator receives information on availability transmitted from the customer terminals expressing a customer's presence or absence at the associated collection and delivery destination at the estimated collection and delivery time, and, when the information on availability indicates that the customer will be absent at the estimated collection and delivery time, calculates a new route that carries over the collection and delivery destination of the associated customer terminal that has transmitted the information on availability.

10. The collection and delivery support system according to claim 2, wherein the mobile terminal displays results of a navigation function possessed by the mobile terminal along with results of the route and the estimated collection and delivery times.

11. The collection and delivery support system according to claim 2, further comprising a bypass information server which registers information on locations to be bypassed; and wherein the mobile terminal includes a sensor that detects a travel state of the electric vehicle, transmits information on the detected travel state of the electric vehicle to the bypass information server, and displays a warning according to information on the locations to be bypassed transmitted from the bypass information server, in a superimposing manner on displayed results of the route and the estimated collection and delivery times.

12. The collection and delivery support system according to claim 2, wherein the mobile terminal includes a sensor which detects a travel speed of the electric vehicle, and, if the detected travel speed of the electric vehicle is a predetermined threshold or more, outputs a command of lowering speed of the electric vehicle to a controller that is provided in the electric vehicle and controls the speed of the electric vehicle.

13. The collection and delivery support system according to claim 1, wherein the route calculator is provided within the mobile terminal, and the collection and delivery destination register outputs the information on the collection and delivery destinations and on the charging locations to the route calculator within the mobile terminal.

14. The collection and delivery support system according to claim 13, wherein the route calculator provided within the mobile terminal updates the route and the estimated collection and delivery times based on information on a position of the mobile terminal.

15. The collection and delivery support system according to claim 1, wherein the route calculator transmits the information on the estimated collection and delivery times calculated to customer terminals associated with respective ones of the collection and delivery destinations.

16. The collection and delivery support system according to claim 15, wherein the route calculator receives information on availability transmitted from the customer terminals expressing a customer's presence or absence at the associated collection and delivery destination at the estimated collection and delivery time, and, when the information on availability indicates that the customer will be absent at the estimated collection and delivery time, calculates a new route that carries over the collection and delivery destination of the associated customer terminal that has transmitted the information on availability.

17. The collection and delivery support system according to claim 1, wherein the mobile terminal displays results of a navigation function possessed by the mobile terminal along with results of the route and the estimated collection and delivery times.

18. The collection and delivery support system according to claim 1, further comprising a bypass information server which registers information on locations to be bypassed; and wherein the mobile terminal includes a sensor that detects a travel state of the electric vehicle, transmits information on the detected travel state of the electric vehicle to the bypass information server, and displays a warning according to information on the locations to be bypassed transmitted from the bypass information server, in a superimposing manner on displayed results of the route and the estimated collection and delivery times.

19. The collection and delivery support system according to claim 1, wherein the mobile terminal includes a sensor which detects a travel speed of the electric vehicle, and, if the detected travel speed of the electric vehicle is a predetermined threshold or more, outputs a command of lowering speed of the electric vehicle to a controller that is provided in the electric vehicle and controls the speed of the electric vehicle.

20. The collection and delivery support system according to claim 1, wherein the electric vehicle is a saddle-ride type electric vehicle.

* * * * *